United States Patent [19]
Kato et al.

[11] Patent Number: 5,721,722
[45] Date of Patent: Feb. 24, 1998

[54] FA CONTROLLER AND DATA PROCESSING METHOD THEREFOR

[75] Inventors: Hiroki Kato; Hideo Shikida; Toshihiko Ogiso; Emi Aisaka; Ikeno Tatsuhiro; Kentaro Morikami; Shigeki Yamada, all of Nagoya, Japan

[73] Assignee: Mitsubishi Denki Kabushiki Kaisha, Tokyo, Japan

[21] Appl. No.: 656,154

[22] Filed: May 30, 1996

[30] Foreign Application Priority Data

May 31, 1995 [JP] Japan ............................. 7-134065
Oct. 13, 1995 [JP] Japan ............................. 7-265595

[51] Int. Cl.⁶ .......................... G06F 13/16; G06F 13/38
[52] U.S. Cl. ........................ 364/131; 364/132; 364/230; 395/200.43
[58] Field of Search .............................. 364/131, 132, 364/238.3, 239, 239.7, 242.3, 244.6, DIG. 1, 228, 228.3, 228.5, 229, 926.9; 395/821, 842, 478, 596, 200.43, 200.83

[56] References Cited

U.S. PATENT DOCUMENTS

| | | | |
|---|---|---|---|
| 4,796,232 | 1/1989 | House | 364/926.9 |
| 4,821,187 | 4/1989 | Ueda et al. | 364/200 |
| 4,947,314 | 8/1990 | Sumida | 364/140 |
| 4,998,245 | 3/1991 | Tanaka et al. | 370/94.1 |
| 4,999,768 | 3/1991 | Hirokawa | 395/200.43 |
| 5,255,388 | 10/1993 | McLaughlin et al. | 364/132 |
| 5,394,399 | 2/1995 | Kawasaki et al. | 370/84 |
| 5,463,767 | 10/1995 | Joichi et al. | 395/183.13 |
| 5,504,926 | 4/1996 | Jackson | 395/825 |
| 5,579,483 | 11/1996 | Imai | 395/200.01 |

FOREIGN PATENT DOCUMENTS

| | | | |
|---|---|---|---|
| 201081A | 11/1986 | European Pat. Off. | 364/132 |
| 0416509 | 3/1991 | European Pat. Off. | |
| 2235065 | 2/1991 | United Kingdom | |
| 2247541 | 3/1992 | United Kingdom | |

*Primary Examiner*—Emanuel T. Voeltz
*Assistant Examiner*—Bryan Bui
*Attorney, Agent, or Firm*—Sughrue, Mion, Zinn, Macpeak & Seas, PLLC

[57] ABSTRACT

A data processing apparatus and method for an FA controller is provided which permits easy collection of response data from a plurality of different types of upper or lower controllers without complicating a user program. The apparatus includes a first control unit 8 for issuing an instruction for designating an object from which data is to be collected, a second control unit 9 for exchanging data with a plurality of upper or lower controllers 3 or 31 according to the instruction, and a two-port memory 16 for facilitating the transfer of information between the first control unit and the second control unit. The second control unit receives the channel number, from which data is to be collected, and an initialization instruction or a sending and receiving instruction issued from the first control unit. The second control unit then refers to the initialization instruction and initializing conditions for each of the plurality of upper or lower controllers for each stored channel number, the instruction for the transfer of data to and from the controllers, and the data to be transmitted or received, in order to transfer data to and from the plurality of controllers and to send response data from the plurality of upper or lower controllers to the first control unit via the two-port memory.

17 Claims, 34 Drawing Sheets

| CHANNEL NO. | COMMUNICATION BOARD NAME | INITIALIZATION DATA | SEND/RECEIVE SETTING DATA |
|---|---|---|---|
| 1 | BSC | 0,9600,1,1000,1000,0,1 | 1 |
| 2 | PLC | 1 | 2,13 |
| 3 | PLC | 1 | 2,24 |
| 4 | PLC | 1 | 3,13 |
| | | | |
| N | RS-232C | 9600,8,N,1 | |

CHANNEL SETTING TABLE 18b

"GROUP 1"

FIG.17

| NUMBER OF BLOCKS | n |
|---|---|
| TYPE OF DEVICE | 1 |
| DEVICE NUMBER | 0 |
| DATA LENGTH | 16 |
| TYPE OF DEVICE | 13 |
| DEVICE NUMBER | 0 |
| DATA LENGTH | 3 |

← GROUP FILE

FIG.22
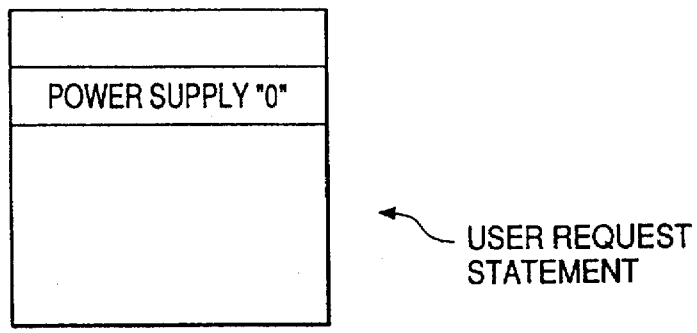
FIG.23
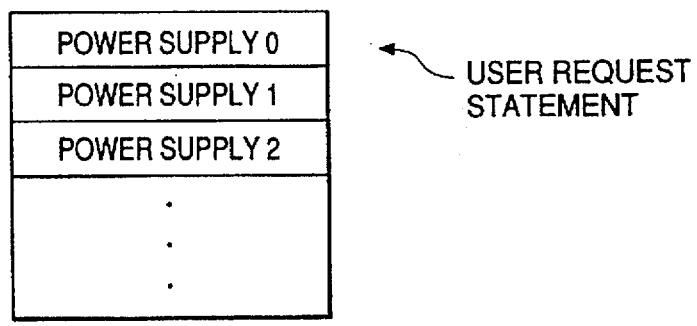
FIG.24
| DEVICE NAME | TYPE OF DEVICE | DEVICE NO. |
|---|---|---|
| POWER SUPPLY 0 | 1 | 0 |
| POWER SUPPLY 1 | 1 | 1 |
| POWER SUPPLY 2 | 1 | 2 |
| ⋮ | ⋮ | ⋮ |
← DEVICE CONVERTING TABLE 18n

| NUMBER OF STATIONS | n |
|---|---|

| ERROR CODE | 0 |
|---|---|

| DEVICE NAME | "POWER SUPPLY 3" |
|---|---|

| STATION NO. | 3 |
|---|---|
| TYPE OF DEVICE | 1 |
| DEVICE NUMBER | 0 |
| REQUEST | |

REQUEST STATEMENT

| DEVICE NAME | STATION NO. | TYPE OF DEVICE | DEVICE NO. |
|---|---|---|---|
| POWER SUPPLY 1 | 1 | 1 | 0 |
| POWER SUPPLY 2 | 2 | 1 | 0 |
| POWER SUPPLY 3 | 1 | 1 | 0 |
| . | . | . | . |
| . | . | . | . |
| . | . | . | . |
| POWER SUPPLY n | n | 1 | 0 |
|  |  |  |  |

DEVICE CONVERTIBLE TABLE 18r

FA CONTROLLER AND DATA PROCESSING METHOD THEREFOR

BACKGROUND OF THE INVENTION

1. Field of the Invention

The present invention relates to a factory automated (FA) controller and a data processing method for the FA controller which monitors operating conditions of devices, such as robots and numerical control devices equipped on an assembly line in a factory, or which issues an instruction for machining to the devices. More particularly, the present invention relates to an FA controller and a corresponding data processing method therefor which acts as an intermediate controller for handing an instruction from an upper controller to a lower controller and for handing data from the lower controller to the upper controller.

2. Description of the Related Art

During a typical data processing operation performed by an FA controller, a data processing program is run to collect the data from a programmable controller (hereinafter referred to as "PLC"). For instance, the programmable controller disclosed in Japanese Patent Laid-Open No. 3-91006 employs a ladder circuit, which has many I/O numbers defined by a user, to create a user program so as to collect data from the PLC.

In another typical data processing operation performed by an FA controller, a data processing program is run to handle data which is received from an upper host computer and transmitted down to a lower programmable controller (hereinafter referred to as "PLC"). For instance, an FA controller 101, as shown in FIGS. 39 through FIG. 41, is equipped with a BSC communication board 110 and an RS232C communication board 128 which establish communication with upper host computers 31 and 36, respectively, and a PLC communication board 111 which establishes communication with a lower PLC 3.

FIG. 39, in particular, shows the configuration of a conventional FA controller. A first memory 13 stores a program run by the first control unit 108 and the data used by the program. The FA controller 101 also includes a first CPU 12 for executing the program stored in the first memory 13, a CRT 14 on which the program executed by the first CPU 12 displays a character string or the like, a keyboard (KB) 15 through which the program executed by the first CPU 12 receives the data entered by a person operating the FA controller 101, and a first two-port memory 119 through which the program run by the first CPU 12 and the program run by a second CPU 122 exchange data.

The BSC communication board 110 establishes communication between the host computer 31 and the first control unit 108 through a BSC communication line 33, a second memory 124 for storing data, and a program for processing communication by the BSC communication board 110, and a second CPU 122 which executes the program stored in the second memory 124 and sends a request for BSC communication to a BSC I/F 23.

The FA controller 101 further includes a second two-port memory 120 through which the program run by the first CPU 12 and a program run by a third CPU 125 exchange data. The FA controller also includes an I/O port 121 through which the first control unit 108 communicates with the PLC communication board 111. The PLC communication board 111 establishes communication between the PLC 3 and the first control unit 108 through a control LAN 2, a third memory 127 for storing data and a program for processing the communication by the PLC communication board 111, and a third CPU 125 which executes the program stored in the third memory 127 and sends a request for PLC communication to a PLC I/F 26 which establishes communication with the PLC 3.

Additionally, the RS232C communication board 128 establishes communication between the host computer 36 and the first control unit 108 through an RS232C communication line 35, a fourth memory 130 for storing data and a program for processing the communication by the RS232C communication board 128, and a fourth CPU 129 which executes the program stored in the fourth memory 130 and sends a data transfer request to a RS232C I/F 34 for communication with the host computer 36.

FIG. 40 is a block diagram illustrating the functions of the conventional FA controller 101. A user program 113a is stored in the first memory 13 and is executed by the first CPU 12 to initialize the BSC communication board 110, the PLC communication board 111, and the RS232C communication board 128. The user program 113a then sends a receive request to the BSC communication board 110 and the RS232C-communication board 128 so as to receive data from the host computer 31 or 36. Based on the received data, the user program 113a sends a send request to the PLC communication board 111 and sends the data to PLC 3.

A BSC communication function 113b is stored in the first memory 13 and is executed by the first CPU 12 to write a request received from the user program 113a in the first two-port memory 119, thereby issuing a request to the BSC communication board 110. Also, the BSC communication function 113b reads a response returned to the first two-port memory 119 and sends it back to the user program 113a. A PLC communication function 113c is stored in the memory 13 and is executed by the first CPU 12 to send a request to the I/O port 121 for writing in the second two port memory 120 in response to the request received from the user program 113a.

The communication function 113c then writes data in a requested position in the second two-port memory 120, thereby issuing a request to the PLC communication board 111, or reads the data of PLC 3 returned to the second two-port memory 120 to the user program 113a. An RS232C communication function 113d is stored in the first memory 13 and is executed by the first CPU 12 to write a request received from the user program 113a in the third two-port memory 137, thereby issuing a request to the RS232C communication board 128, or it reads a response returned to the third two-port memory 137 and sends it back to the user program 113a.

FIG. 41 is a flowchart illustrating the operation of the conventional FA controller 101. The FA controller 101 begins operation in step S1300 and in step S1301, requests the BSC communication function 113b to initialize the BSC communication board 110. At this time, the user program 113a hands the initialization setting data, such as communication speed and communication conditions, over to the BSC communication function 113b. In step S1302, the FA controller requests the PLC communication function 113c to initialize the PLC communication board 111. In step, S1303, the FA controller requests the RS232C communication function 113d to initialize the RS232C communication board 128. At this time also, the initialization setting data including communication speed and communication conditions are provided to the RS232C communication function 113b.

The FA controller 101 sends a receive request to the BSC communication function 113b in step S1304, and receives data from the BSC communication function 113b in step S1305. The FA controller 101 then sends a receive request to the RS232C communication function 113d in step S1306, and receives data from the RS233C communication function 113d in step S1307. In step S1308, the FA controller 101 creates data to be sent to the PLC 3 according to the data received in step S1305 and step S1307. In step S1309, the controller provides the created data to the PLC communication function 113c together with a send request, thereby transmitting the data to the PLC 3. Afterward, the controller goes back to step S1304 to begin the next processing.

In the conventional FA controller described above, every communication processing of the upper and lower controllers is implemented by a user program. Therefore, the user program becomes complicated, presenting problems such as difficulty in modifying the user program so as to accommodate a change in the configuration of the PLC apparatus or a communication system, and difficulty in using the same user program for another FA apparatus.

SUMMARY OF THE INVENTION

An object of the present invention is to provide an FA controller and a data processing method for an FA controller which permits easy collection of response data from a plurality of different types of upper or lower controllers without complicating a user program.

Another object of the present invention is to provide an FA controller and a data processing method for an FA controller which permits fast transfer of data between a data area in a memory and a data area in a two-port memory.

In order to achieve the above objects, the present invention provides a data processing apparatus for a factory automated (FA) controller, comprising first and second control units. The first control unit commands an operation for collecting data from a plurality of upper or lower controllers. The second control unit exchanges data with the plurality of upper or lower controllers in response to the command issued by the first control unit.

The second control unit includes a memory which stores, in advance of issuance of the command by the first control unit, at least a portion of data or a data processing instruction identifying a manner in which the data collected from the upper or lower controllers is to be processed. Furthermore, the FA controller includes a two-port memory which enables transfer of information, including the command, between the first and second control units.

The FA controller also includes another two-port memory which enables transfer of second information between the second control unit and the plurality of upper or lower controllers. In this arrangement, that other two-port memory comprises a communication area which includes a first area for storing command data relating to an object from which data is to be collected, and a second area for storing response data collected from an upper or lower controller. The other two-port memory also includes a sending/receiving interval area which stores communication time intervals indicating a time of communication with the upper or lower controller. Additionally, the second control unit comprises a communication area, which includes a first area for storing command data to the object from which data is to be collected and a second area for storing response data collected from the upper or lower controller, and a refreshing function element which transfers data between the first areas and between the second areas, and between the communication area of the second control unit and the communication area of the another two-port memory, at the communication time intervals indicated in the sending/receiving interval area.

In another arrangement, the first control unit includes a designator which designates a plurality of channel numbers indicating from which of the upper or lower controllers data is to be collected, and request data which comprises initialization data and send/receive data. Also, the memory of the second control unit includes a channel setting table for storing the initialization data and the send/receive data in association with the channel numbers.

In a further arrangement, the first control unit includes a communication request issuer which issues, at one time, a plurality of communication requests which comprise communication instructions and data. The memory of the second control unit also further includes an area which stores the communication instructions and data provided from the first control unit to the second control unit via the two-port memory.

In another arrangement, the memory of the second control unit includes a section which stores, as a single group of data, the data processing instructions, data representing those of said upper or lower controllers which originate a request for data processing, and data representing those of the upper or lower controllers which are request destinations of the data processing.

Additionally, in another arrangement, the memory of the second control unit includes a group file setting portion which stores data collecting conditions relating to the collection of data from the plurality of upper or lower controllers in association with group names which have been set. Also, the first control unit includes a specifier which specifies at least one of the group names to control collection of the data in accordance therewith.

In still a further arrangement, the memory of the second control unit includes a device information setter which stores comments, indicating characteristics of the devices controlled by the plurality of upper or lower controllers from which data is to be collected, and identifies the devices in relation to the comments. Also, the first control unit includes a specifier which specifies comments which are compared to the comments stored in the device information setter to specify from which of the plurality of upper or lower controllers the data is to be collected.

In another arrangement, the memory of the second control unit includes a device information setter which stores comments, indicating characteristics of the devices controlled by the plurality of upper or lower controllers from which data is to be collected, and identifies the devices in relation to the comments. The first control unit includes a specifier which, at a time of initialization of said upper or lower controllers, specifies a number of portions of data to be collected, and specifies comments which are compared to the comments stored in the device information setter to specify from which of the plurality of upper or lower controllers the data is to be collected.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIG. 17 is a configuration diagram showing a group file reserved in a group file area 18k in the fourth embodiment;

FIG. 22 is a configuration diagram showing a user request statement written by the user program 13a to the request data area 16a in the fifth embodiment;

FIG. 23 is a configuration diagram showing a comment file registered in a comment file area 3a in the fifth embodiment;

FIG. 24 is a configuration diagram showing a device converting table 18n in the fifth embodiment;

DETAILED DESCRIPTION OF THE PREFERRED EMBODIMENTS

FIGS. 1 to 6 illustrate a first embodiment of the present invention, in particular, an FA controller apparatus which allows response data to be obtained by using the same program specifying procedure of a user program for different communication boards.

Figure 1:
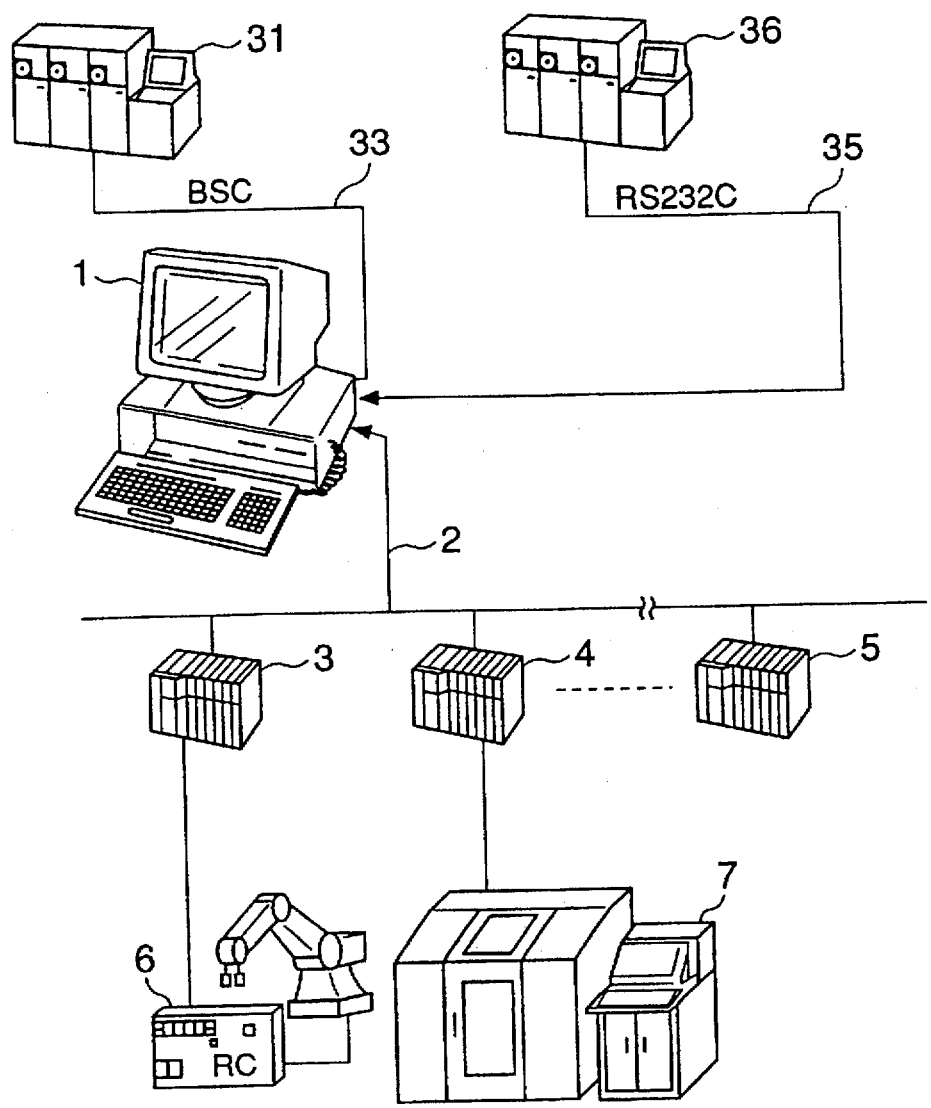
FIG. 1 is a configuration diagram of a system which employs an FA controller according to a first embodiment of the present invention.

FIG. 1 is a diagram showing an example of the configuration of a system employing an FA controller apparatus according to the first embodiment. The FA controller apparatus 1 processes data such as a target quantity of production, for example, sent from host computers 31 and 36 through BSC communication lines 33 and 35, and sends out operation data to a first PLC 3 to an n-th PLC 5 through a control LAN 2. The first PLC 3 controls the robot controller 6, the second PLC 4 controls the numerically controlled device 7, and the n-th PLC 5 controls a control unit which controls another machine.

Figure 2:
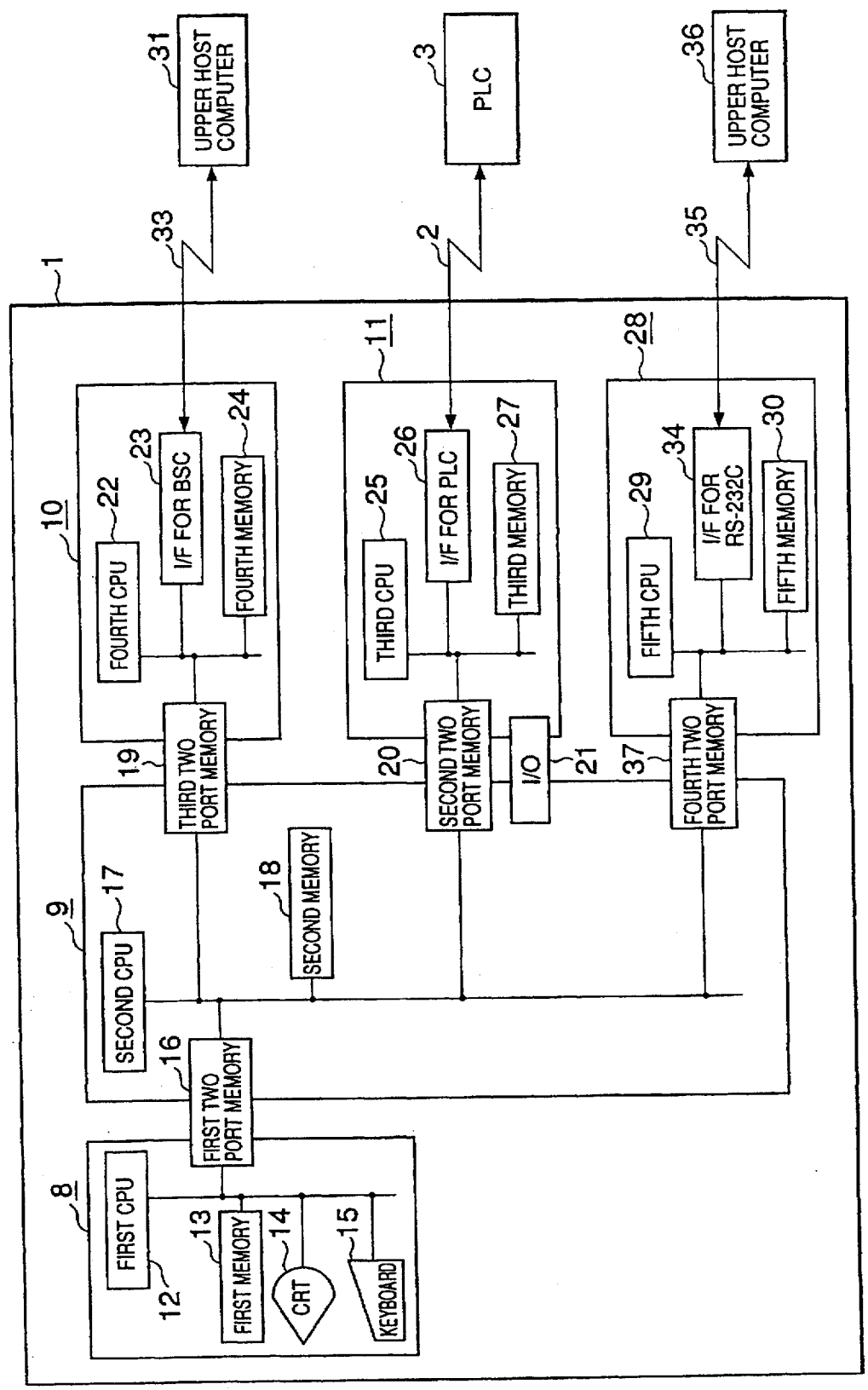
FIG. 2 is a block diagram showing the configuration of an FA controller 1 of the first embodiment illustrated in FIG. 1.

FIG. 2 is a block diagram showing an example of the configuration of an FA controller apparatus 1 according to the first embodiment.

The FA controller apparatus 1 includes a first control unit 8, a second control unit 9, a BSC communication board 10, a PLC communication board 11 and an RS-232C communication board 28. The first control unit 8 includes a first CPU 12, a first memory 13 for storing data and a program executed by the first CPU 12, a CRT 14 for displaying a character string and the like by the program stored in the first memory 13, and a keyboard 15 through which an operator enters data and the like. The second control unit 9 includes of a second CPU 17, and a second memory 18 for storing data and a program executed by the second CPU 17.

The BSC communication board 10 includes a fourth CPU 22, a BSC I/F 23 for communicating with the host computer 31, which receives a request for communication from the fourth CPU 22, and a fourth memory 24 for storing data and a program executed by the fourth CPU 22. The PLC communication board 11 includes a third CPU 25, a PLC I/F 26 for communicating with the PLC 3, which receives a request for communication from the third CPU 25, and a third memory 27 for storing data and a program executed by the third CPU 25. The RS-232C communication board 28, on the other hand, includes a fifth CPU 29, an RS-232C I/F 34 for communication with the host computer 36, which receives a request for communication from the fifth CPU 29, and a fifth memory 30 for storing data and a program executed by the fourth CPU 29.

A first two-port memory 16 is employed for reading and writing data to allow for the exchange of data between the first CPU 12 of the first control unit 8 and the second CPU 17 of the second control unit 9. A third two-port memory 19 is employed for reading and writing data 'so as to allow exchange of data between the second CPU 17 of the second control unit 9 and the fourth CPU 22 of the BSC communication board 10. A second two-part memory 20 is employed for reading and writing data so as to allow exchange of data between the second CPU 17 of the second control unit 9 and the third CPU 25 of the PLC communication board 11. An I/O port 21 is employed for communicating between the second control unit 9 and the PLC communication board 11 and a fourth two-port memory 37 is used for reading and writing data so as to exchange of data between the second CPU 17 of the second control unit 9 and the fifth CPU 29 of the RS-232C communication board 28.

Figure 3:
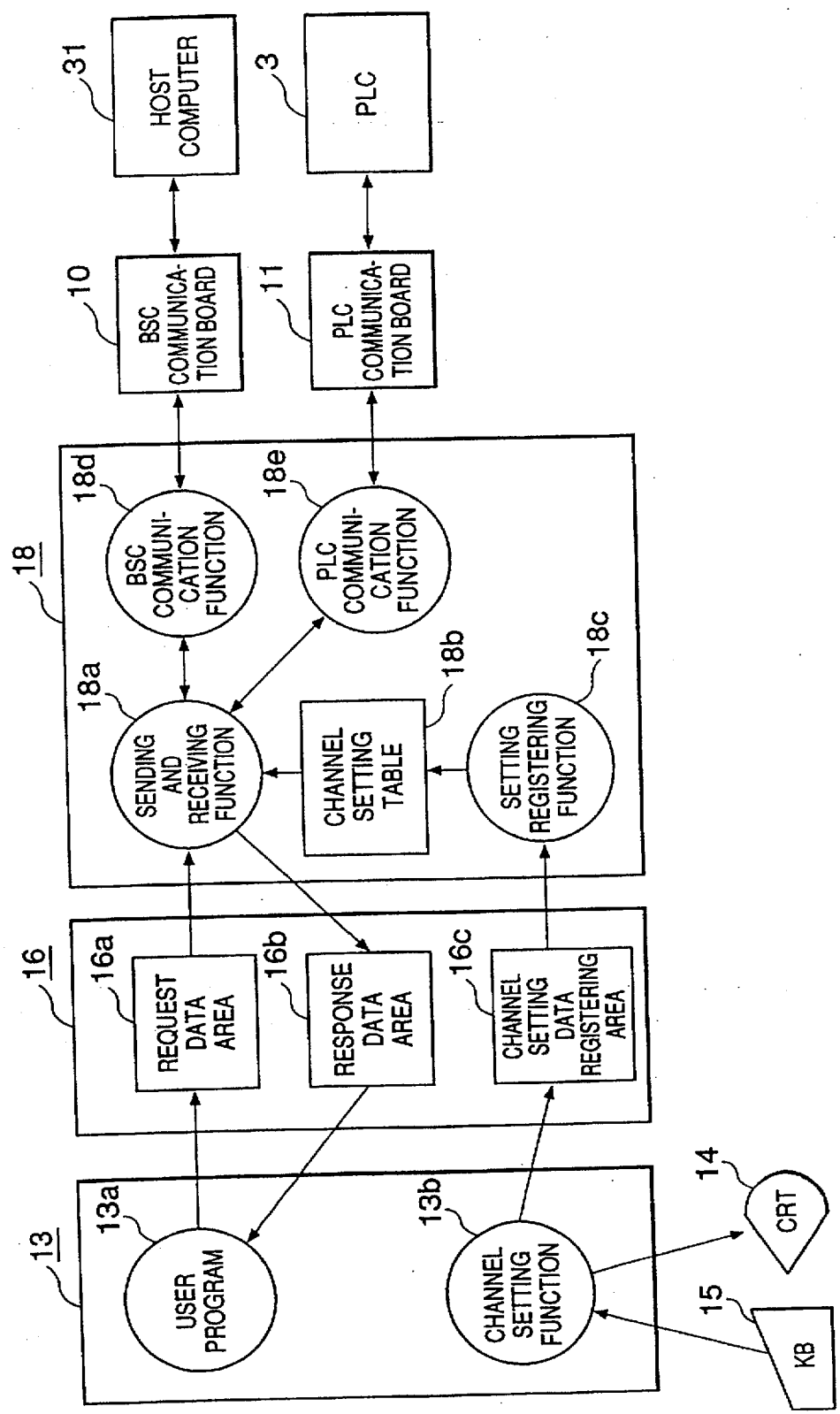
FIG. 3 is a block diagram showing a function implemented between a first control unit 8 and a second control unit 9 in the first embodiment.

FIG. 3 is a block diagram showing the configuration of the operation of the FA controller apparatus 1 according to the first embodiment of the present invention. A user program 13a in the first memory 13 is implemented by the first CPU 12, which sends a receive request to the BSC communication board 10 to receive data from the host computer 31. The first CPU 12 issues a send request to the PLC communication board 11 in accordance with the data in order to send data to the PLC 3. A channel setting function 13b in the first memory 13 is also implemented by the first CPU 12, which writes the data that is entered through the keyboard 13 and displayed on the CRT 14, to a channel setting data registering area 16c.

The first two-port memory 16 includes a request data area 16a, a response data area 16b, and the channel setting data registering area 16c.

In the second memory 18, a sending and receiving function 18a is implemented by the second CPU 17, which reads a channel number, a request content, and request data from the request data area 16a. The CPU 17 sends a processing request to a BSC communication function 18d or a PLC communication function 18e, in accordance with the contents of a channel setting table 18b, and writes received response data to the response data area 16b. The channel setting table 18b stores channel numbers for identifying the data registered by a setting registering function 18c, a communication board name at the requested destination for each channel number, setting data at the time of initialization request for each channel number (referred to as "initialization data" hereafter), and data which is fixedly sent to the BSC communication function 18d or the PLC communication function 18e at the time of send/receive request for each channel number (referred to as "send/receive setting data" hereafter).

A function 18c in the second memory 18 is implemented by the second CPU 17 to register the data in the channel setting data registering area 16c in the channel setting table 18b. BSC communication function 18d in the second memory 18 issues a request for initialization, a request for transmission data, or a request for receiving of data, to the BSC communication board 10 via the third two port memory 19 in response to a processing request received from the send/receive function 18a, and delivers the data received via the third two-port memory 19 to the send/receive function 18a. PLC communication function 18e in the second memory 18 issues a request for initialization, request for transmission of data, or a request for receiving of data, to the PLC communication board 11 via the second two port memory 20 in response to a processing request received from the send/receive function 18a, and then delivers the data responded via the second two-port memory 20 to the send/receive function 18a.

Figure 4:
FIG. 4 is a configuration diagram of a channel setting table 18b in the first embodiment.

FIG. 4 is a diagram showing an example of a channel setting table 18b in the first embodiment. The channel setting table 18b includes a channel number column for registering channel numbers, a communication board name column for registering the names of communication boards issuing processing requests, an initialization data column for registering the initialization data to be provided to the BSC communication function 18d or the PLC communication function 18e, and a send/receive setting data setting column for registering the send/receive setting data to be provided to the BSC communication function 18d or the PLC communication function 1Be when a send or receive request is issued. For example, if "1" is specified as the channel number, then the send/receive function 18a performs processing in accordance with the data indicated in the first line. The communication board column includes "BSC", which means that a request is issued to the BSC communication function 18d.

If the request is for initialization, then the send/receive function 18a sends, for example, seven digits, (i.e. "0, 9600, 1, 1000, 1000, 0, 1") which is the data in the initialization data column, to the BSC communication function 18d. If the request is, on the other hand, for transmission/receipt of data, then the send/receive function 18a adds "1", which is the data in the send/receive setting data column, to the request data and sends it to the BSC communication function 18d.

Figure 5:
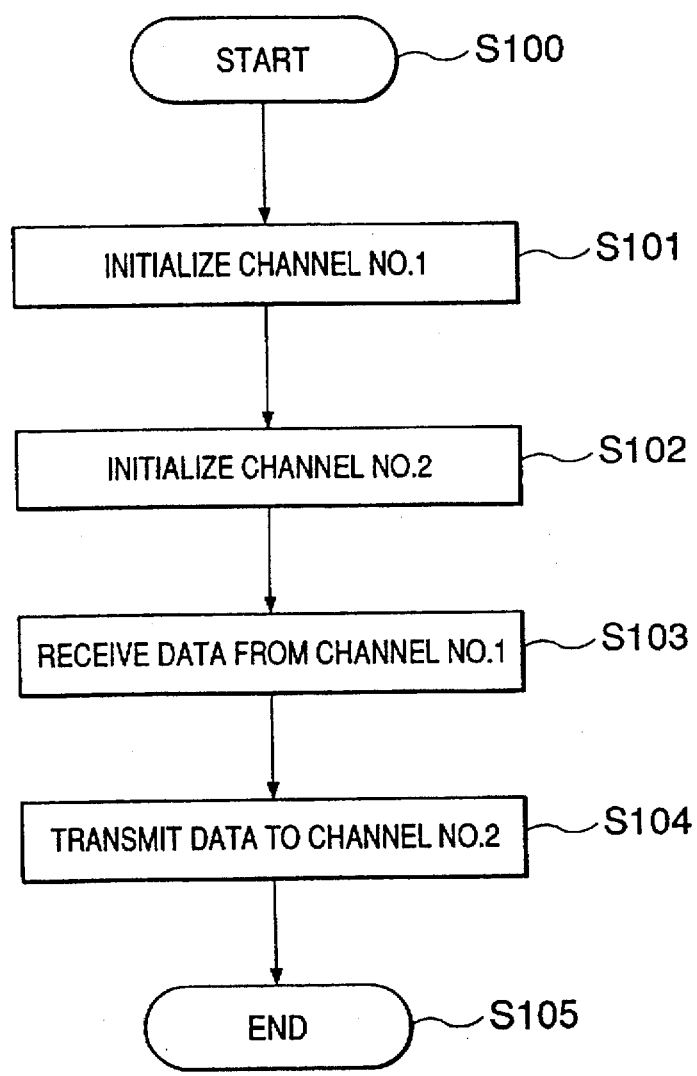
FIG. 5 is a flowchart showing the operation of a user program 13a in the first embodiment.

FIG. 5 is a flowchart showing the operation of a user program 13a in this embodiment. The content of the channel setting table 18b is set by the setting registering function 18c before the user program 13a is activated. When the user program 13a is activated in step S100, it writes request data, of which the channel number is "1" and the request content is "initialization", into the request data area 16a to initialize the BSC communication board 10 set in the channel setting table 18b, as shown in step 101. The user program 13a further writes request data, of which the channel number is "2" and the request content is "initialization," into the request data area 16a in step S102 to initialize the PLC communication board 11 set in the channel setting table 18b.

The user program 13a then writes request data, of which the channel number is "1" and the request content is "request for receive," into the request data area 16a in step S103 to request the receiving of data from the host computer 31 via the BSC communication board 10 set in the channel setting table 18b, and then reads out received data from the response data area 16b. The user program 13a then writes request data, of which the channel number is "2" and the request content is "request for send" into the request data area 16a in step S104 to send the data to the PLC 3 via the PLC communication board 11 set in the channel setting table 18b. The series of operations is terminated in step S105.

Figure 6:
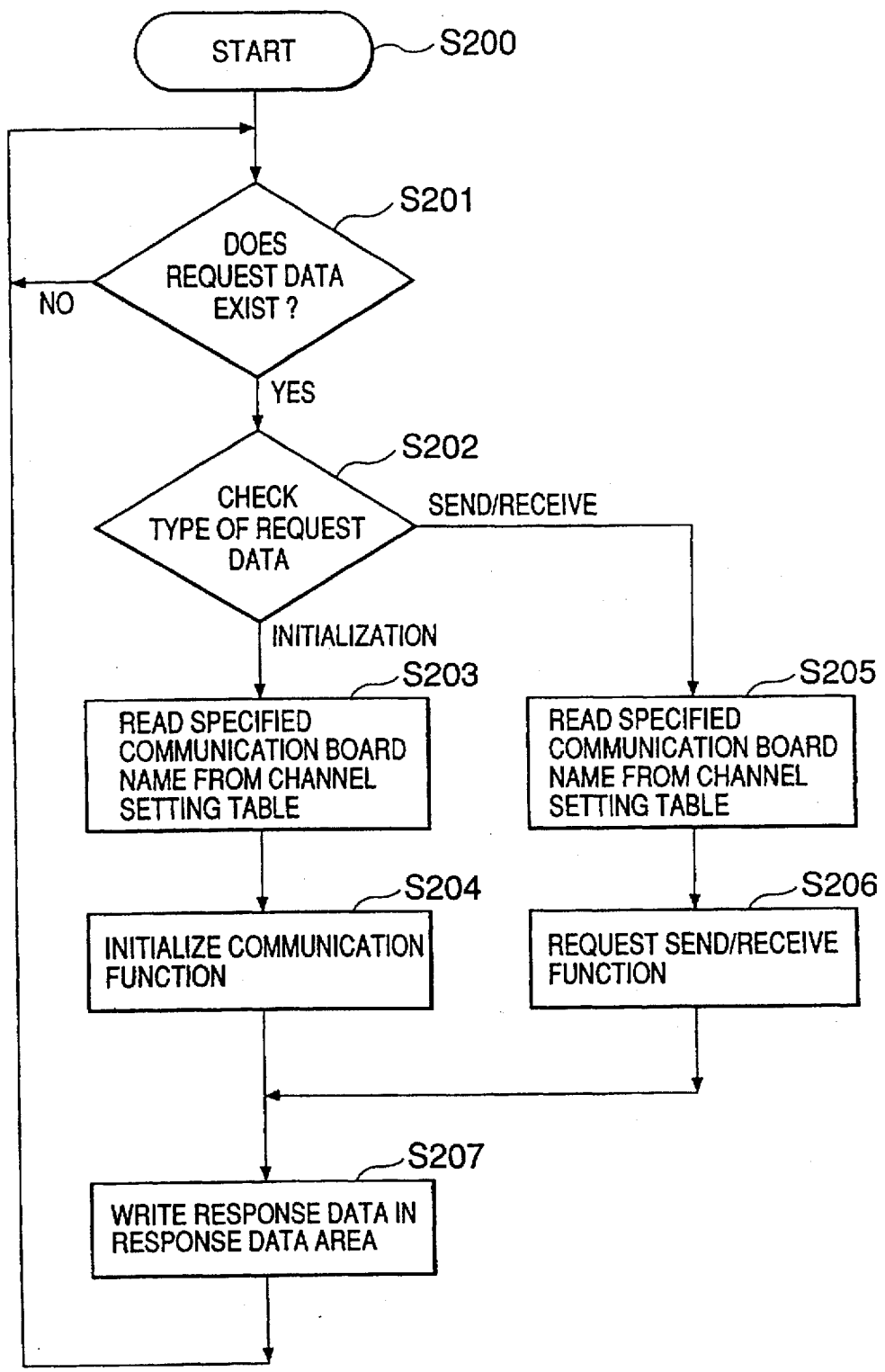
FIG. 6 is a flowchart showing the operation of a send/receive function 18a in the first embodiment.

FIG. 6 is a flowchart showing the operation of a sending and receiving function 18a.

As shown in FIG. 6, the send/receive function 18a begins its operation in step S200 and checks whether request data exists in the request data area 16a in step S201. If the send/receive function 18a finds no request data, then it goes back to the beginning and repeats the checking until request data occurs. If the send/receive function 18a finds request data, it checks the content of the request data in step S202. If the content of the request data is the request for initialization, then, in step S203, the send/receive function 18a reads out the communication board name corresponding to the channel number specified in the request data and the initialization data from the channel setting table 18b. Then, the send/receive function 18a performs initialization in step S204.

If the content of the request data is the request for send/receive, then, in step S205, the send/receive function 18a reads out from the channel setting table 18b the communication board name corresponding to the channel number specified in the request data and the send/receive setting data. Then, in step S206, the send/receive function 18a adds the send/receive setting data to the request data in the request data area 16a to request for send/receive. The send/receive function 18a then receives response data from the BSC communication function 18d or the PLC communication function 18e and writes the response data in the response data area 16b in step S207.

As explained above, according to this embodiment, the channel numbers, the communication board names, the initialization data, and the send/receive setting data are registered beforehand in the channel setting table 18b by the channel setting function 13b. Therefore, the user program 13a only has to write the channel number and request data such as initialization, send, or receive into the request data area 16a, in order to have the send/receive function 18a refer to the contents of the channel setting table 18b, exchange data with a different communication board (the BSC communication function 18d or the PLC communication function 18e), and write data to the response data area 16b. Accordingly, the user program 13a can easily acquire response data from the response data area 16b. Hence, the user program 13a can obtain response data by using the same program specifying procedure for different communication boards.

Another embodiment of the present invention, in which communication among different communication boards is performed a number of times without complicating a user program, will be described with reference to FIG. 7 to FIG. 10.

Figure 7:
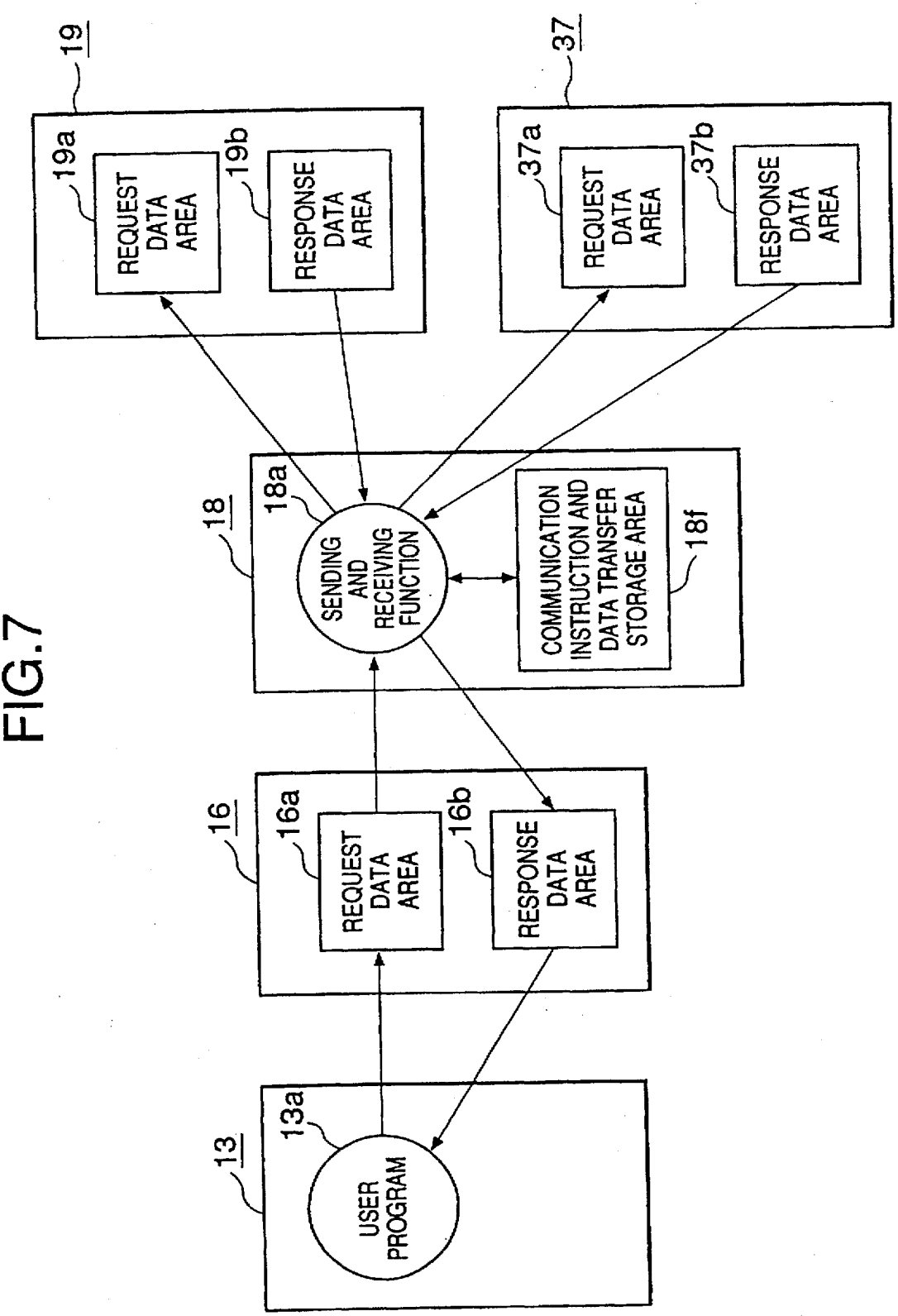
FIG. 7 is a block diagram showing a function implemented among the first control unit 8, a first two-port memory 16, the second control unit 9, a third two-port memory 19, and a fourth two-port memory 37 according to a second embodiment of the present invention.
Figure 8:
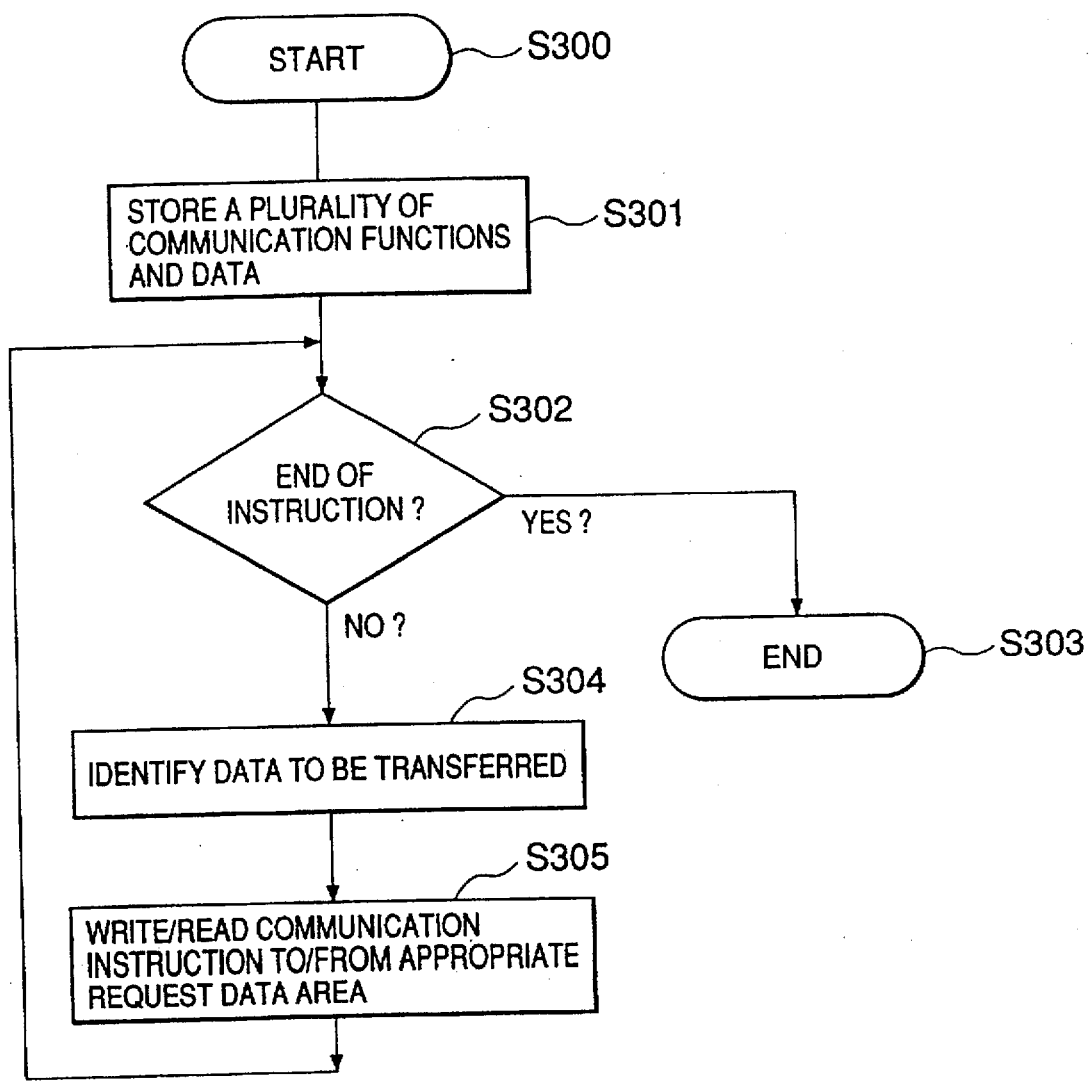
FIG. 8 is a flowchart showing the operation of the send/receive function 18a in the second embodiment.
Figure 9:
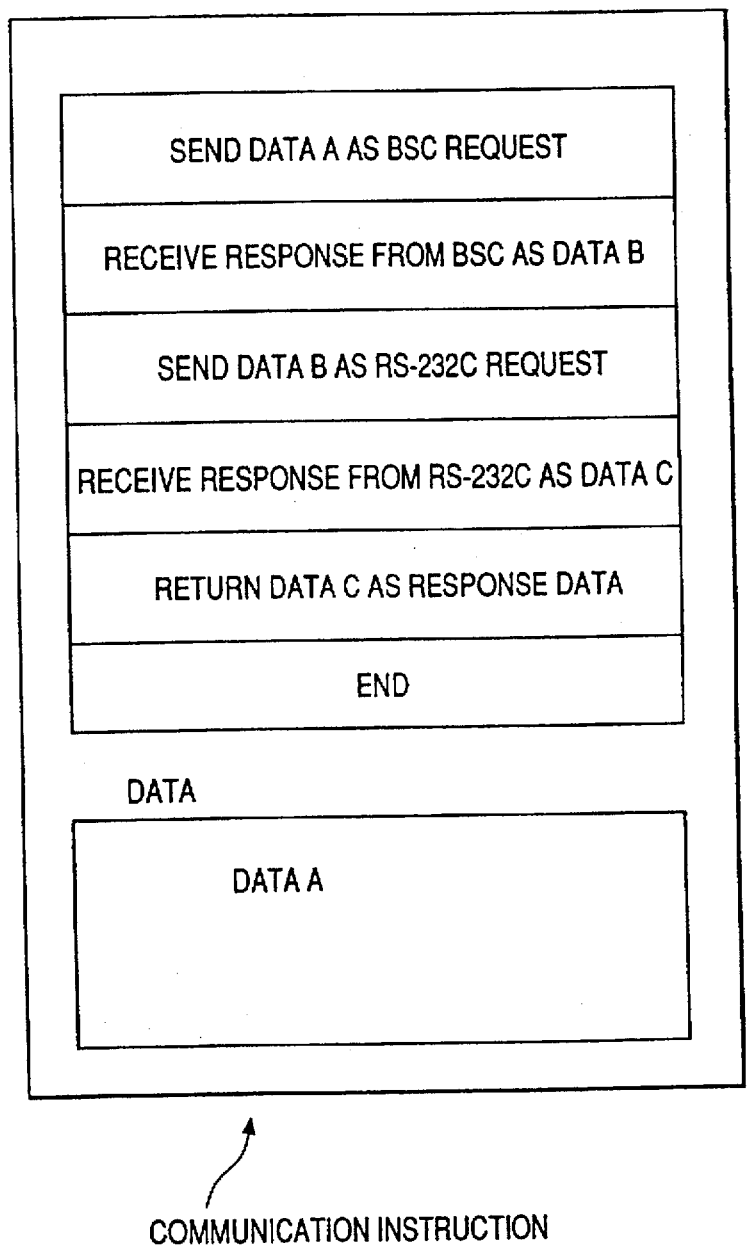
FIG. 9 is a configuration diagram showing contents of a communication request which provides the user program 13a to the send/receive function 18a in the second embodiment.
Figure 10:
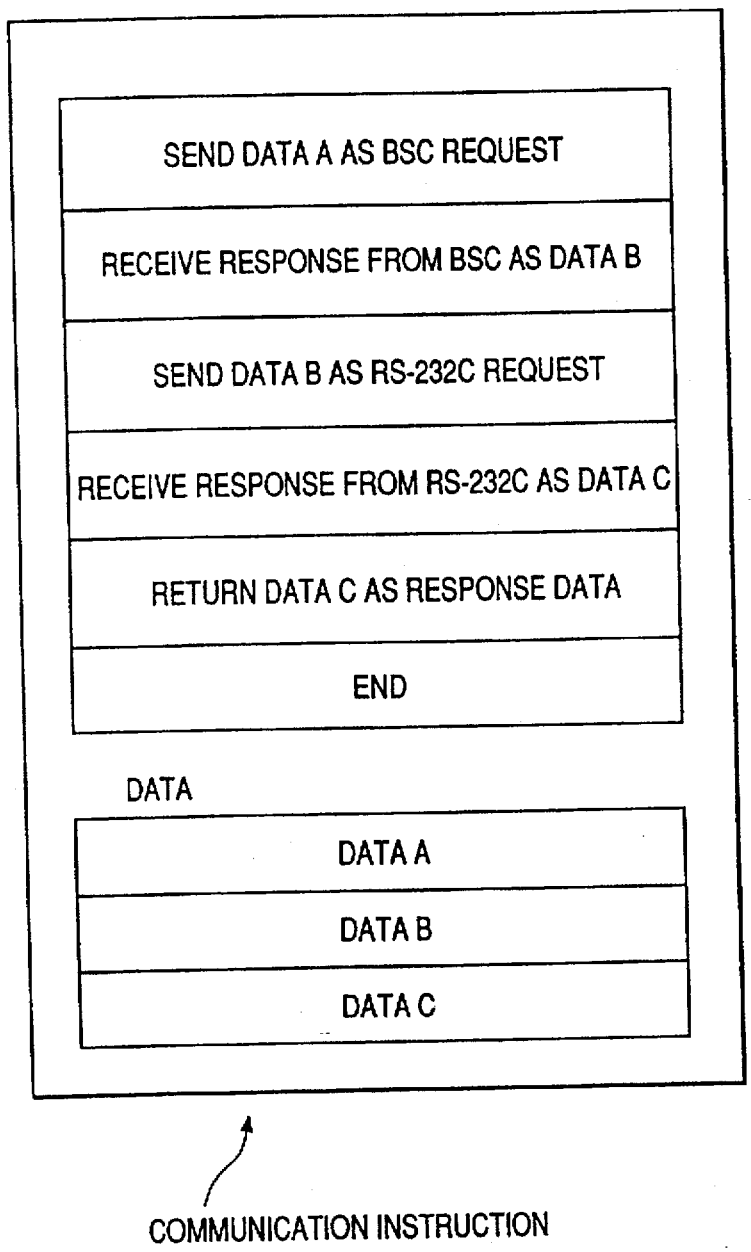
FIG. 10 is a configuration diagram showing the communication instructions and data stored in an area 18f in the second embodiment.

FIG. 7 is a block diagram illustrative of a function which is implemented among the first memory 13 in the first control unit 8, the first two-port memory 16, the second memory 18 in the second control unit 9, the third two-port memory 19, and the fourth two-port memory 37. FIG. 8 is a flowchart showing the operation of the send/receive function 18a. FIG. 9 is a diagram showing the configuration of an example of a communication request handed from the user program 13a to the send/receive function 18a. FIG. 10 is a diagram showing an example of a communication instruction and data stored in an area 18f of the second memory 18.

As shown in FIG. 7 the second memory 18 includes an area 18f in which both the communication instructions from the user program 13a and the data transferred between the user program 13a and the respective communication boards are stored. A request data area 19a in the third two-port memory 19 stores request data being issued to the BSC communication board 10, and a response data area 19b stores response data from the BSC communication board. A request data area 37a in the fourth two-port memory 37 stores request data being issued to the RS-232 communication board 28, and a response data area 37b stores response data from the RS-232C communication board 28.

The user program 13a writes both the communication instructions and data, which are a plurality of communication requests, to the request data area 16a at one time.

As shown in FIG. 8, the send/receive function 18a begins its operation in step S300 and, in step S301, stores a plurality of communication instructions and data, which have been stored in the request data area 16a, in a first storage area (not shown) in the area 18f. Then, the user program 13a takes out one of the communication instructions in step S302 to check for the end of the instruction. If the instruction is terminated, then the operation of the send/receive function 18a is terminated in step S303. If the instruction is not terminated, then the user program 13a recognizes which data should be transferred to which communication board in step S304. Finally, in step S305, the user program 13a writes the communication instruction to the request data area 19a corresponding to the BSC communication board 10 or the request data area 37a corresponding to the RS-232C communication board 28.

On the other hand, the response data from the BSC communication board 10, which has been written to the response data area 19b, or the response data from the RS-232C communication board 28, which has been written to the response data area 37b, is stored by the send/receive function 18a in a second storage area (not shown) in the area 18f. Then, the stored data is written to the response data area 16b in accordance with the communication instruction from the user program 13a. The user program 13a then reads out the data from the response data area 16b.

FIG. 9 shows an example of the communication requests from the user program 13a, containing a communication instruction which includes five different instructions which specify the type of communication, and data which is provided from the user program 13a to the send/receive function 18a involving only one type of data (i.e. data A). At the ends of the communication requests, character strings or numerals indicating an end may be placed.

As shown in FIG. 10, the communication instruction, which has been provided from the user program 13a to the send/receive function 18a, is stored as it is and is erased after being executed. Data A provided from the user program 13a to the send/receive function 18a, and data B and C, which are temporary data generated at the time of sending or receiving in accordance with the communication instruction, are stored. Data A, B, and C are erased as soon as the communication instruction is terminated.

Hence, in summary, according to the second embodiment, the user program 13a writes a plurality of communication requests, that is, communication instructions and data to the request data area 16a at one time, and the send/receive function 18a receives and stores them in the area 18f. After that, the send/receive function 18a retrieves the stored communication instructions in order, collects data from the BSC communication board 10 or the RS232C communication board 28 in accordance with the instructions, and stores the collected data in the area 18f. The required data is returned to the user program 13a via the response data area 16b in accordance with communication instructions. Therefore, it is possible to carry out a plurality of data transfers to and from various communication boards by executing the user program 13a only once.

This second embodiment shows an example in which the second control unit 9 exchanges information with an upper controller. However, the same procedure applies when the second control unit 9 exchanges information with a lower controller.

A third embodiment of the invention, in which data can be acquired from various communication boards without complicating a user program will now be described with reference to FIG. 11 to FIG. 13.

Figure 11:
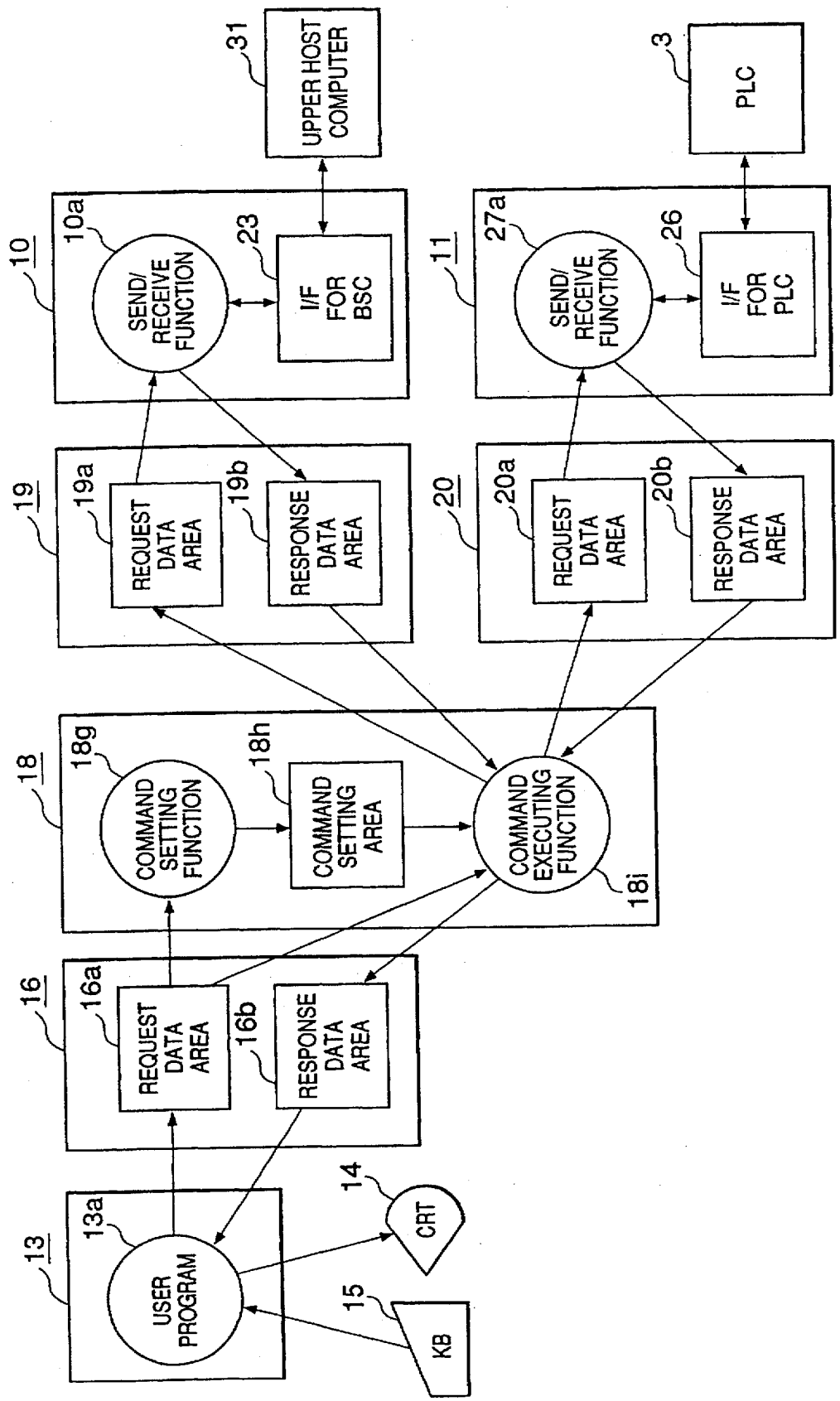
FIG. 11 is a block diagram showing a function which is implemented among the first control unit 8, the first two-port memory 16, the second control unit 9, the third two-port memory 19, a second two-port memory 20, a BSC communication board 10, and a PLC communication board 11 in accordance with a third embodiment of the present invention.

FIG. 11 is a block diagram showing the functions implemented among the first control unit 8, the first two-port memory 16, the second control unit 9, the third two-port memory 19, the second two-port memory 20, the BSC communication board 10, and the PLC communication board 11. FIG. 12 is a diagram showing an example of the content of an instruction setting area 18h. FIG. 13 is a flowchart showing the operation of an instruction executing function 18i.

As shown in FIG. 11, the second memory 18 includes a command setting function 18g which is a processing instruction setting function for storing a command sent from the user program 13a in a command setting area 18h. A command executing function 18i checks the command setting area 18h to determine whether a command processing request is present, and sets a request originator or a request destination when a command processing request is present. The command executing function 18i thus serves as a bridge for communication between the host computer 31 and the PLC 3, or as a bridge for communication between the PLC 3 and the user program 13a. The command setting area 18h in the second memory 18 is an area in which the commands are stored.

A request data area 19a in the third two-port memory 19 is an area in which the command executing function 18i writes data via a writing function (not shown), and a response data area 19b is an area in which the data received from the host computer 31 is stored. The data is read out by the command executing function 18i via a reading function (not shown). A request data area 20a in the second two-port memory 20 is an area in which the command executing function 18i writes data via a writing function (not shown), and a response data area 20b is an area in which data from the PLC 3 is stored. The data is read out by the command executing function 18i via a reading function (not shown).

A send/receive function 10a in the BSC communication board 10 is responsible for the transfer of data between the third two-port memory 19 and the host computer 31, and a send/receive function 27a is responsible for the transfer of data between the second two-port memory 20 and the PLC 3.

Figure 12:
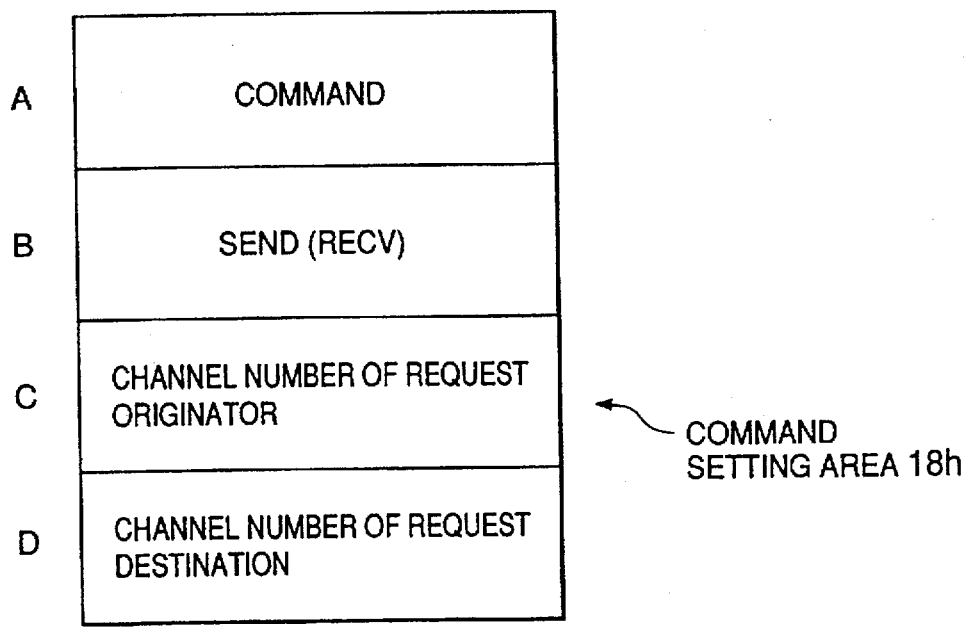
FIG. 12 is a configuration diagram showing a command setting area 18h in the third embodiment.

As shown in FIG. 12, which represents an example of the command setting area 18h, area A of the command setting area 18h is an area where a command for determining whether a command processing request is set. For example, in the case of a command processing request, "COMMAND" request is set. Area B is an area where a command for determining whether a send request or a receive request is set. For example, in the case of send request, "SEND" is set, and "RECV" is set in the case of a receive request. Area C is an area where the channel number of a request originator, that is, the identifying number of a communication board, is set. Area D is an area where the channel number of a request destination is set.

Figure 13:
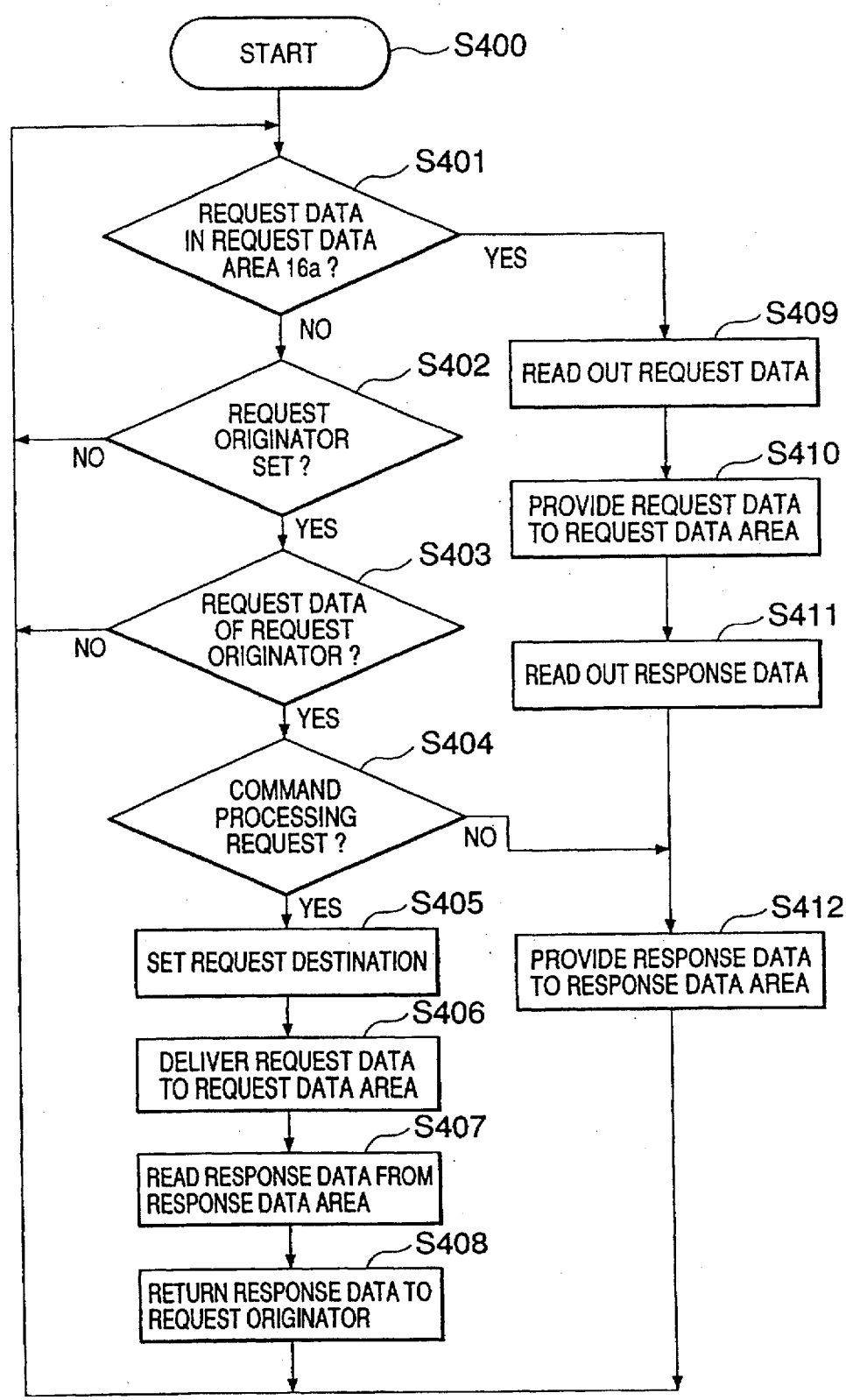
FIG. 13 is a flowchart showing the operation of a command executing function 18i in the third embodiment.

In FIG. 13, which illustrates an operation flowchart of command executing function 18i, the command executing function 18i begins its operation in step S400 and, in step S401, checks whether request data exists or not in the request data area 16a. If the command executing function 18i does not find any request data, it then checks in step S402 whether a request originator has been set in the command setting area 18h. If no request originator is found to be set, then processing returns to step S401. However, if the command executing function 18i finds request originator which has been set, then it checks in step S403 whether there is request data associated with the request originator. If there is not request data, then processing returns to step S401. If there is request data, then in step S404, the command executing function 18i checks whether the request data is a command processing request.

If the command executing function 18i finds the request data to be a command processing request, in step S405, it then refers to the content of the command setting area 18h to set the request destination, and in step S406, delivers the request data to the request data area of the request destination. In step S407, the command executing function 18i reads out response data from the response data area of the request destination. In step S406, the response data is returned to the request originator and the processing returns to step S401 to check the request data area 16a again for request data.

If, however, it is determined in step S404 that the request data is not a command processing request, then response data is delivered to the response data area 16b in step S412. When the instruction executing function 18i finds request data in step S401, the request data is read out in step S409 and provided to the request data area 19a or the request data area 20a in step S410. Then, in step S411, the response data is read out from the response data area 19b or the response data area 20b, and the response data is then provided to the response data area 16b in step S412.

Hence, according to this embodiment, the command executing function 18i sorts out request destinations and request originators in accordance with the data in the command setting area 18h. Therefore, the user program 13a only has to write command setting data to the request data area 16a to obtain data from various communication boards, thereby achieving a simpler user program.

Figure 14:
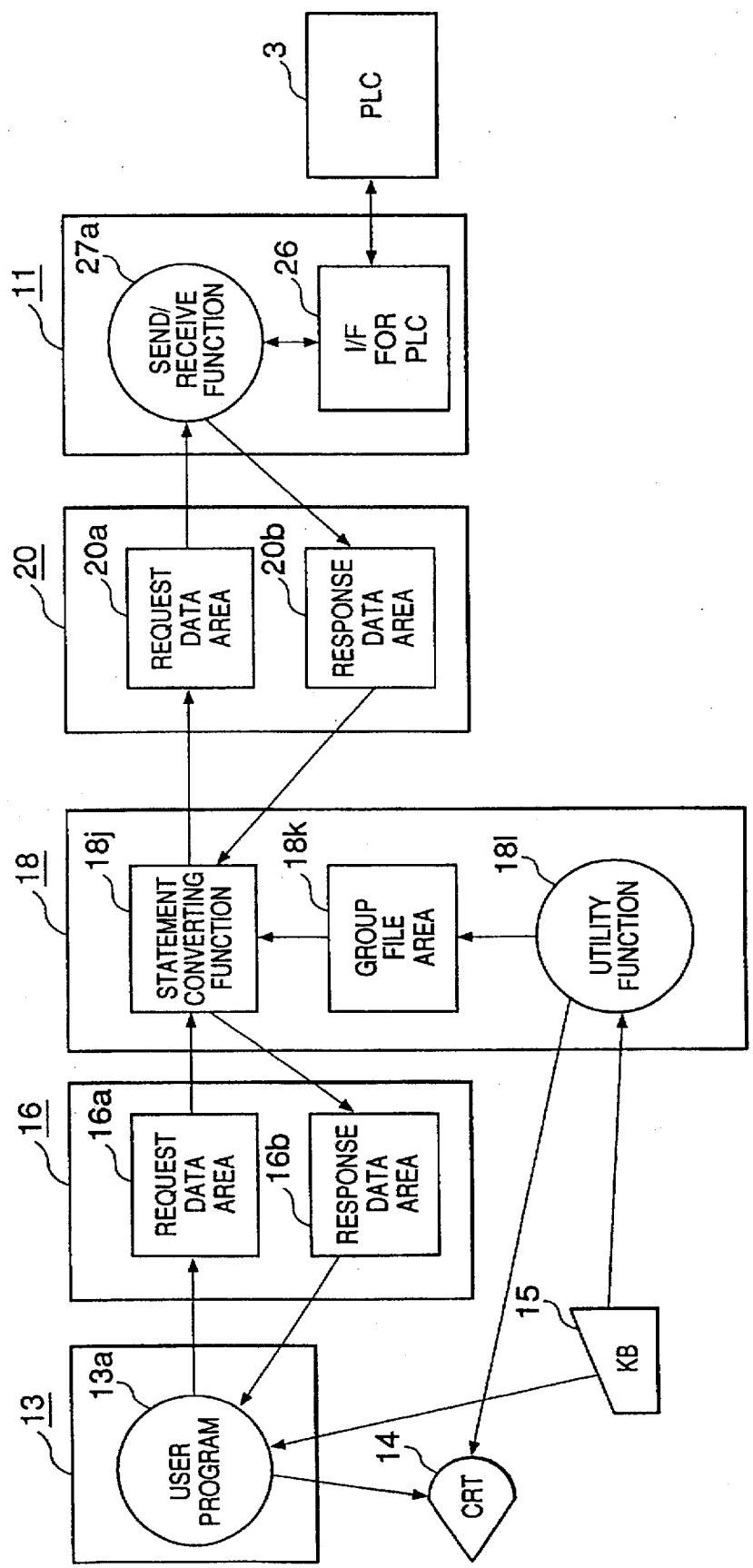
FIG. 14 is a block diagram showing a function implemented among the first control unit 8, the first two-port memory 16, the second control unit 9, the second two-port memory 20, and the PLC communication board 11 according to a fourth embodiment of the present invention.
Figures 15, 16:
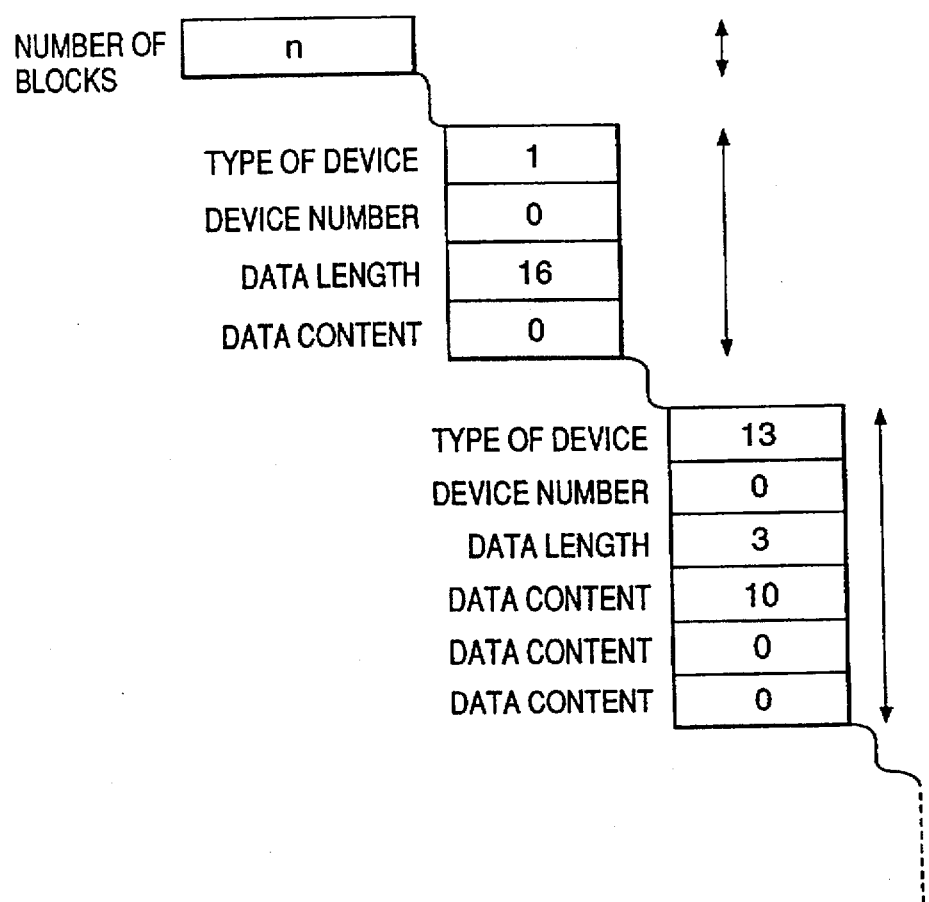
FIG. 15 is a configuration diagram showing a user request statement reserved in a request data area 16a in the fourth embodiment.
FIG. 16 is a configuration diagram showing a user response statement reserved in a response data area 16b in the fourth embodiment.
Figure 18:
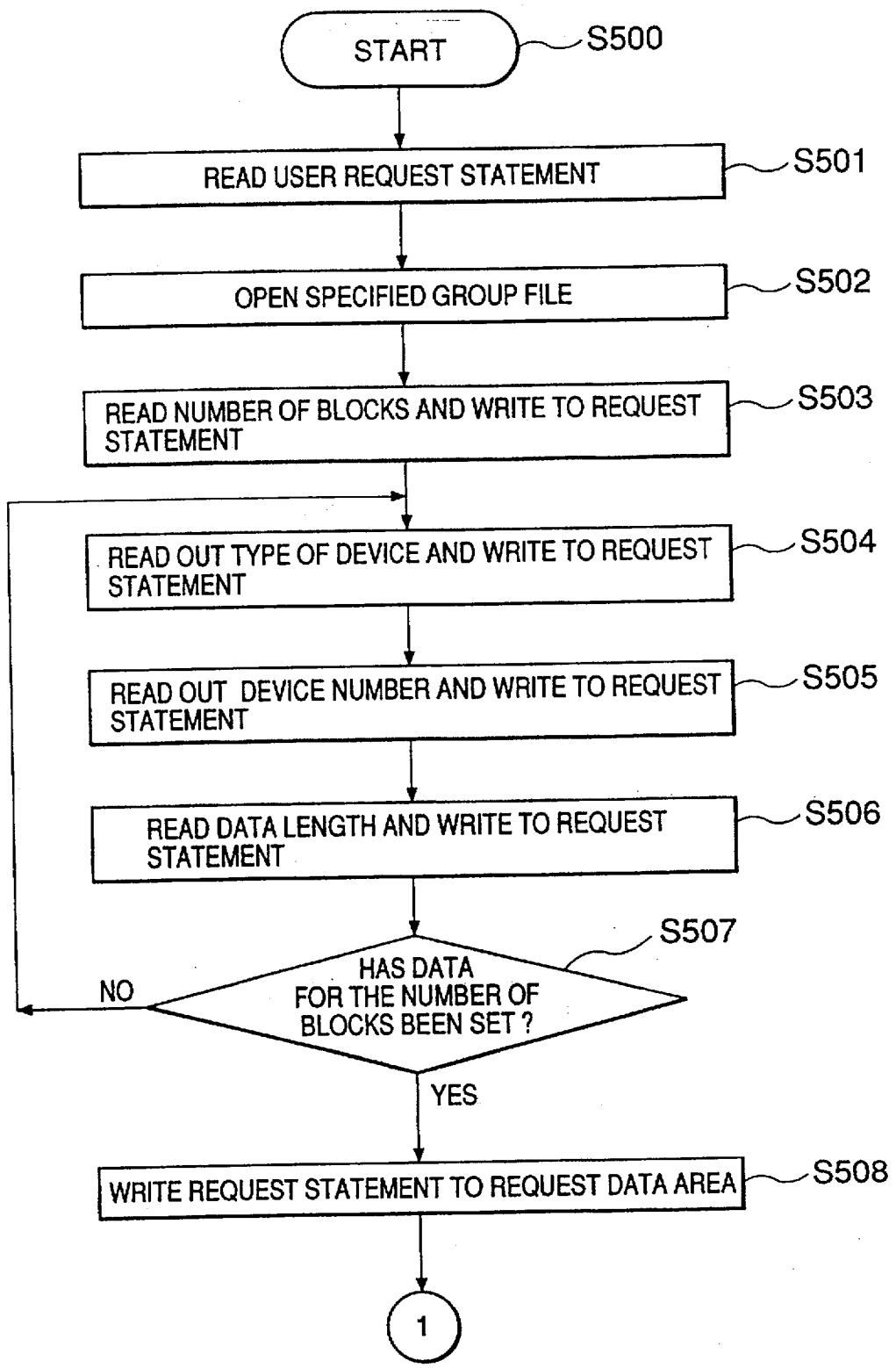
FIG. 18 is a flowchart showing the operation of a statement converting function 18j in the fourth embodiment.
Figure 19:
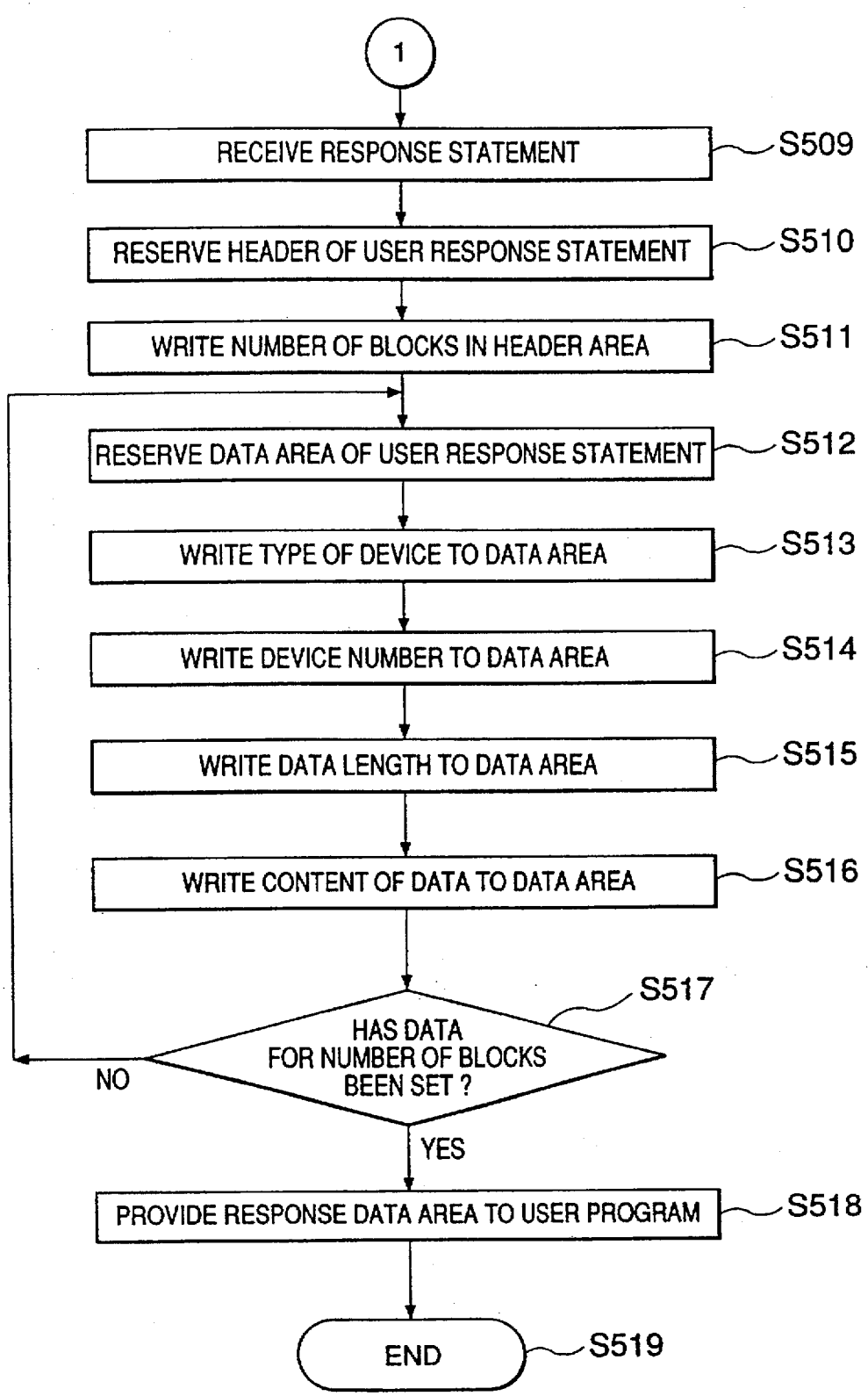
FIG. 19 is a flowchart showing the operation of the statement converting function 18j in the fourth embodiment.
Figure 20:
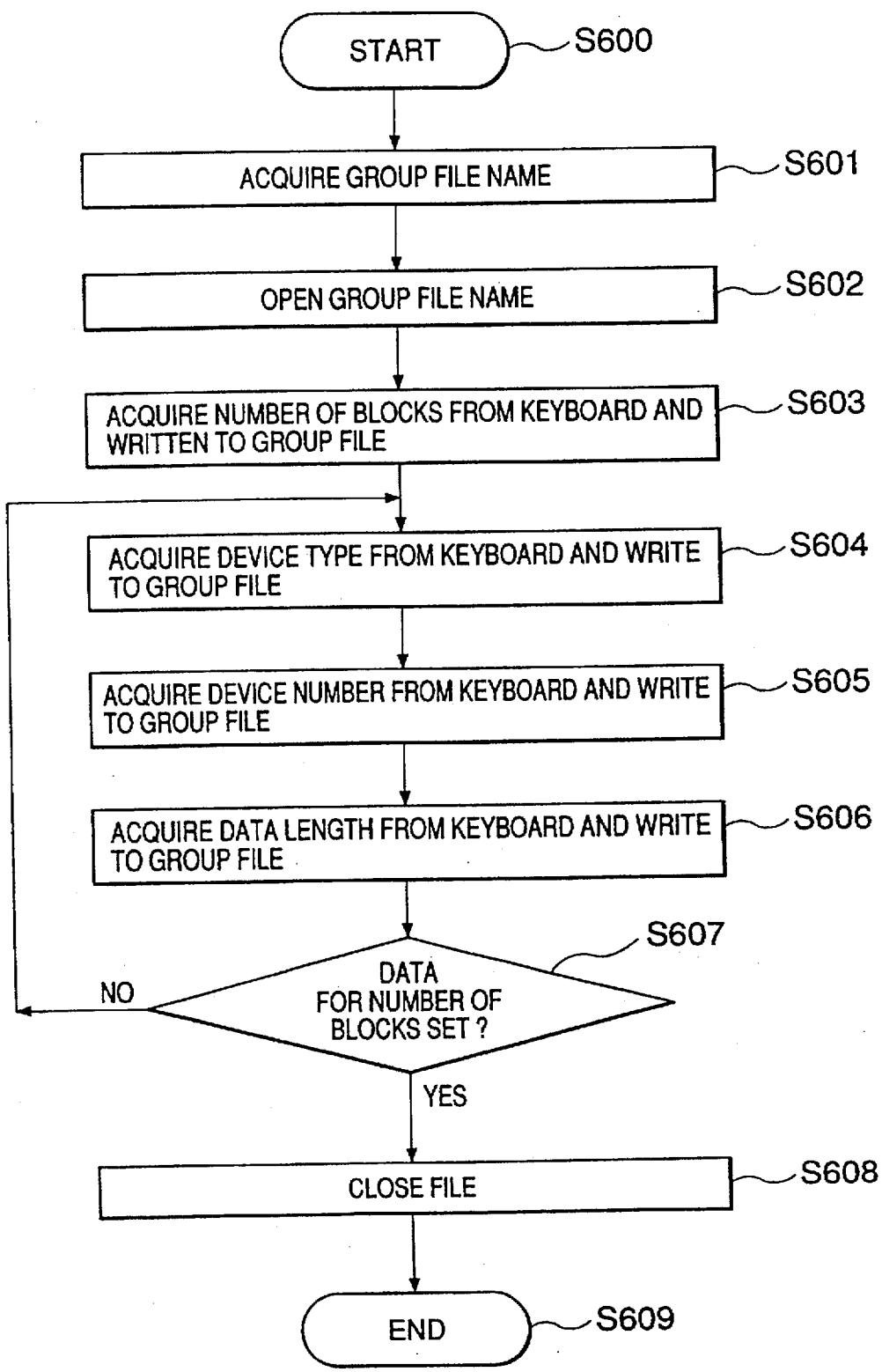
FIG. 20 is a flowchart showing the operation of a utility function 18l in the fourth embodiment.

Referring to FIG. 14 to FIG. 20, a fourth embodiment of the present invention will be described in which a user program only has to specify a group file name to obtain data from various devices in an easy-to use format. FIG. 14 is a block diagram showing functions which are implemented among the first memory 13 in the first control unit 8, the first two-port memory 16, the second memory 18 in the second control unit 9, the second two-port memory 20, and the PLC communication board 11. FIG. 15 is a diagram showing the configuration of a user request statement reserved in the request data area 16a. FIG. 16 is a diagram showing the configuration of a user response statement reserved in the response data area 16b. FIG. 17 is a diagram showing the configuration of a group file reserved in a group file area 18k. FIG. 18 and FIG. 19 are flowcharts showing the operation of a statement converting function 18j. Finally, FIG. 20 is a flowchart showing the operation of a utility function 18l.

As shown in FIG. 14, the second memory 18 includes a statement converting function 18j which receives a user request statement sent from the user program 13a via the request data area 16a, creates a request statement in accordance with the content of a group file area 18k, and provides the request statement to the request data area 20a in the second two-port memory 20. The statement converting function 18j further creates a user response statement in accordance with the content of a response statement which has been written to the response data area 20b by the send/receive function 27a, and writes it to the response data area 16b. A utility function 18l in the second memory 18 is a group file setting function, which creates a group file according to the data entered through the keyboard 15, and stores the created group file in the group file area 18k.

FIG. 15 shows an example of a user request statement reserved in a request data area 16a. In FIG. 15, "GROUP I", which has been set by the utility function 18l, is set as a group file name of user request statement.

Based on the group file name, the statement converting function 18j creates a request statement and writes it to the request data area 20a.

As shown in FIG. 16, the number of blocks which indicates the number of pieces of data read out from the PLC 3, i.e. "n" in this case, is stored in the header area of the user response statement. The next data area stores the type of device, device number, data length, and data content. The type of device indicates the device of the PLC 3 from which the data has been read out. For example, "1" indicates device X and "13" indicates device D.

The device number indicates the number of the device from which the data has been read out. The data length indicates the size of the data. For example, the data length is "16" bits for the X device, or "3" words for the D device. The data content indicates the data which has been read out from each device. For example, the data content indicates that all data from X0 to XF are OFF for the X device, and indicates that the value of D0 is "10", the value of D1 is "0", and the value of D2 is "0" for the D device.

As shown in FIG. 17, the group file is constituted by the number of blocks, the type of device, device number, and data length. In this example, the same numerical values as those shown in FIG. 16 are stored in the corresponding places.

As shown in FIG. 18 and FIG. 19, which are flowcharts illustrating the operation of the statement converting function 18j, the statement converting function 18j starts its operation in step S500. In step S501, the statement converting function 18j reads out a user request statement written to the request data area 16a by the user program 13a. In step S502, the statement converting function 18j opens the group file of the group file name specified in the user request statement. In step S503, the number of blocks from the opened group file, are read out and written to the request statement.

Then, in step S504, the statement converting function 18j reads out the type of device from the opened group file and writes it to the request statement. In step S505, the device number is read from the opened group file and written it to the request statement. In step S506, the statement converting function 18j reads out the data length from the opened group file and writes it to the request statement.

In step S507, the statement converting function 18j determines whether pieces of data of the number which corresponds to the number of blocks read out have been set. If it is determined that the setting has not yet been performed, then the processing returns to step S504 to repeat steps 504 to 506. If the statement converting function 18j determines that pieces of data of the number which corresponds to the number of blocks have been set, then in step S508, the request statement is written to the request data area 20a, to thus be provided to the send/receive function 27a.

In step S509, the statement converting function 18j receives a response statement, which has been written by the send/receive function 27a, from the response data area 20b. In step S510, the statement converting function 18j reserves the header area of the user response statement in the response data area 16b, and in step S511, writes the number of blocks in the header area. Then, in step S512, the statement converting function 18j reserves the data area of the user response statement in the request data area 16a. In step S513, the type of device is written to the data area, and the device number is written to the data area in step S514. The data length is written to the data area in step S515, and the content of data of the response statement is written in the data area in step S516.

In step S517, the statement converting function 18j determines whether pieces of data of the number which corresponds to the number of blocks have been set. If no such data has been set, then processing returns to step S512 to repeat steps 512 to 516. If such data does exist then the content of the response data area 16b is provided to the user program 13a in step S518, and the processing terminates at step S519.

Further, as shown in FIG. 20, the utility function 18l starts its operation in step S600. In step S601, the group file name is acquired from the keyboard 15, and the group file is opened in step 602. In step S603, the number of blocks is acquired from the keyboard 15, and that number is written to the header area of the group file. In step S604, the type of device is acquired from the keyboard 15, and the type is written to the data area of the group file.

In step S605, the device number is acquired from the keyboard 15 and written to the data area of the group file. In step S606, the data length is acquired from the keyboard 15 and written to the data area of the group file. In step S607, the utility function 18l determines whether the data corresponding to the number of blocks has been set. If no such data has been set processing returns to step S604 to repeat steps S604 to S606. if such data has been set then the file is closed in step S608.

Hence, the utility function 18l opens group files which correspond to a plurality of group file names in the group file area 18k by entries through the keyboard 15 and writes the number of blocks, the type of device, the device number, and the data length, which are the information on PLC 3, to the respective group files. The user program 13a only has to specify a group file name to have the statement converting function 18j open the group file which corresponds to the group file name, create a request statement in a format corresponding to the device in accordance with the content of the opened group file, and collect the data on PLC 3 via the send/receive function 27a. Then, the data is obtained as a response statement and delivered back to the user program 13a as the user response statement in a user-friendly format. This enables the user program 13a to collect a plurality of pieces of data on PLC 3 as the data in an easy-to-use format simply by specifying a group file name.

Figure 21:
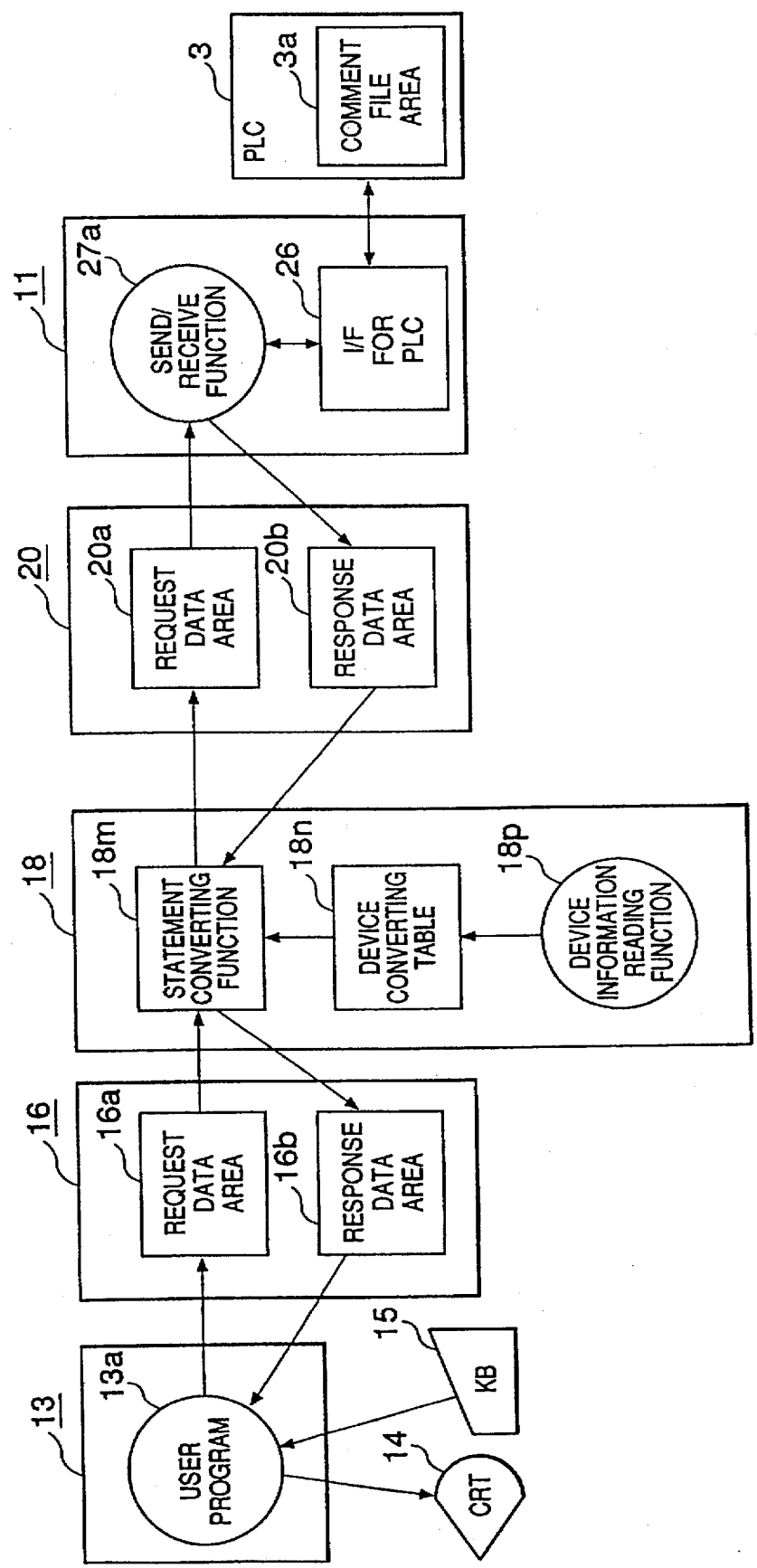
FIG. 21 is a block diagram showing a function implemented among the first control unit 8, the first two-port memory 16, the second control unit 9, the second two-port memory 20, the PLC communication board 11, and a PLC 3 according to a fifth embodiment of the present invention.
Figure 25:
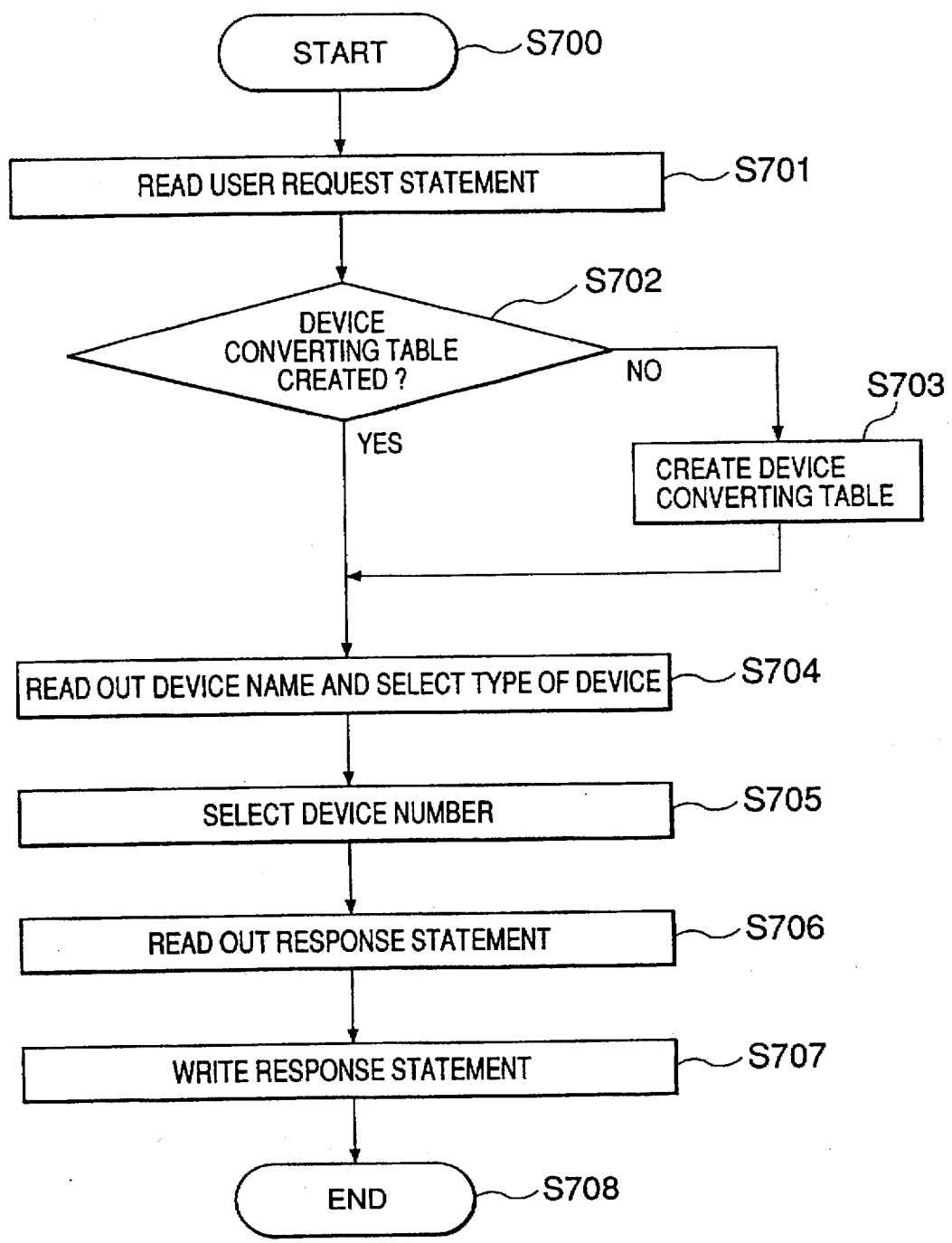
FIG. 25 is a flowchart showing the operation of the statement converting function 18m in the fifth embodiment.

A fifth embodiment of the invention, in which a user program only has to specify a device name to acquire data from a device, will be described with reference to FIG. 21 to FIG. 25. FIG. 21 is a block diagram showing functions which are implemented among the first memory 13 in the first control unit 8, the first two port memory 16, the second memory 18 in the second control unit 9, the second two-port memory the PLC communication board 11, and the PLC 3. FIG. 22 is an example of a user request statement which the user program 13a writes in the request data area 16a. FIG. 23 is an example of a comment file registered in a comment file area 3a. FIG. 24 illustrates an example of the content of a device converting table 18n in which the content of the comment file shown in FIG. 23 has been registered. Finally, FIG. 25 is a flowchart showing the operation of a statement converting function 18m.

As shown in FIG. 21, the second memory 18 includes a statement converting function 18m which converts a comment added to a user request statement obtained from the user program 13a via the request data area 16a into a corresponding type of device or device number. A device converting table 18n registers the type of device and device number of the PLC 3 read out by a device information reading function 18p, corresponding to a device name. A device information reading function 18p indicates a device information setting function which reads out the contents of the comment files registered in the comment file areas 3a, which will be discussed later, via the PLC communication board 11, and registers them in the device converting table 18n, which corresponds to a device name every type of device and device number of the PLC 3. The first PLC 3 includes a comment file area 3a which stores comment files in which comments on device names for each type of device and for each device number of the PLC 3 are registered by a user in advance.

When configuring the system shown in FIG. 1, most users recognize the device of the first PLC 3 in association with the robot controller 6 to create a ladder circuit. Usually, signals such as inputs and outputs of the PLCs are sorted by the type of device, e.g., device X and device Y. There are a plurality of types of devices which are controlled by device numbers. For instance, to allocate device X as the power supply for the robot controller 6, the user registers "POWER SUPPLY 0," which is the device name, as the comment to be given to device X0. The user program 13a sets a comment in the user request statement to be written to the request data area 16a.

As shown in FIG. 22, the characters "POWER SUPPLY 0" are stored in the column of the device name of the user request statement. The characters are identical to those of the device name registered in the comment file 3a. For instance, when the user needs to know the state of "POWER SUPPLY 0" of the robot controller 6, the user program 13a writes directly the device name, i.e., "POWER SUPPLY 0", to the request data area 16a.

As shown in FIG. 23, the comments on the device names which correspond to devices X0, X1, X2 . . . of the PLC 3 of the comment file are "POWER SUPPLY 0", "POWER SUPPLY 1", and "POWER SUPPLY 2," . . . , respectively. These comments are registered before the user issues a communication request to the first PLC 3 via the PLC communication board 11.

As shown in FIG. 24, which illustrates an example of the device converting table 18n, the device names which correspond to the types of devices and device numbers are stored in the table 18n as a single table. The device information reading function 18p reads out all device information collectively from a comment file, and registers all the device names, which have been read out, in the device converting table 18n. The device information reading function 18p also registers the types of devices and device numbers corresponding to already registered device names.

As shown in FIG. 25, the statement converting function 18m begins its operation in step S700, and in step S701, reads out a user request statement, which has been received from the user program 13a, from the request data area 16a. In step S702, the user request statement read out is checked to determine whether the device converting table 18n has been created. If the device converting table 18m has not been created, then in step S703 the device information reading function 18p reads out a comment file from the comment file area 3a via the PLC communication board 11 to create the device converting table 18n.

If the device converting table 18n has been created, then in step S704, "POWER SUPPLY 0", which is the device name in the user request statement illustrated in FIG. 22, is read out via the request data area 16a and the type of device, for example, "1" which matches to "POWER SUPPLY 0", is selected among the device names contained in the device converting table 18n shown in FIG. 24 and written as the request statement in the request data area 20a. Likewise, the device number, for example, "0" which matches to "POWER SUPPLY 0", is selected among the device names contained in the device converting table 18n, and written in the request data area 20a in step S705. In step S706, a response statement, which has been received from the send/receive function 27a, is read out from the response data area 20b, and the response statement is written in the response data area 16b in step S707 in order to return it to the user program 13a as the user response statement. The operation is then terminated in step S708.

Hence, as demonstrated above, the user has only to specify the comment, such as a device name, in the user program 13a as the user request statement in order, to read out the type of device and device number from the device converting table 18n, that is, the statement converting function 18m refers to the device name, so that the data may be read out from the PLC 3 via the send/receive function 27a. Therefore, even if the user does not know the type of device or device number which corresponds to a device name, he/she can obtain required data simply by specifying the device name. In addition, the number of arguments set in the user program can be reduced, thereby improving usability and maintainability of a user program.

Figure 26:
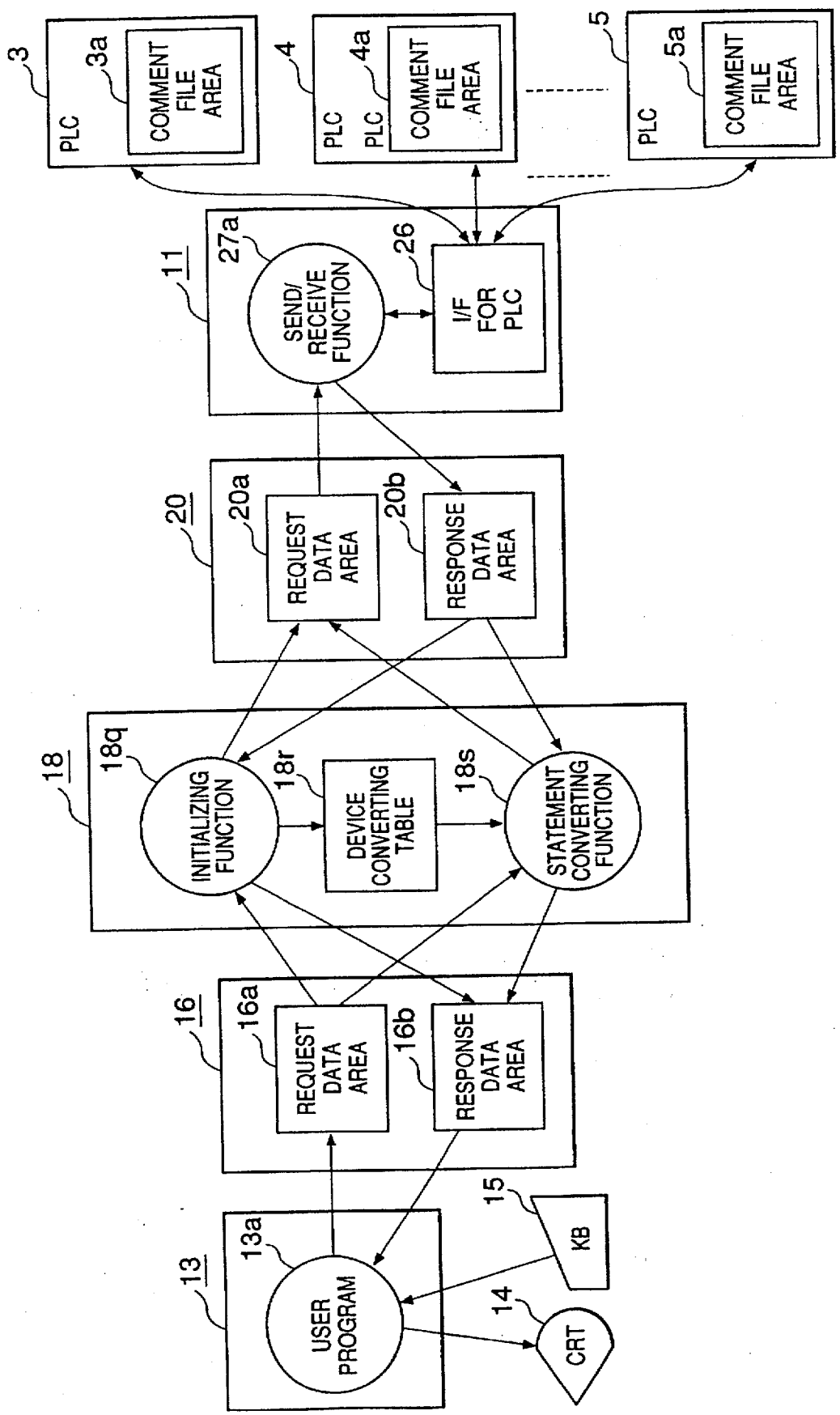
FIG. 26 is a block diagram showing a function implemented among the first control unit 8, the first two-port memory 16, the second control unit 9, the second two-port memory 20, the PLC communication board 11, and PLCs 3, 4, and 5 according to a sixth embodiment of the present invention.
Figures 27, 28, 29, 30:
FIG. 27 is a configuration diagram showing an initialization request statement reserved in the request data area 16a in the sixth embodiment.
FIG. 28 is a configuration diagram showing an initialization response statement reserved in a response data area 16b in the sixth embodiment.
FIG. 29 is a configuration diagram showing a user request statement reserved in a request data area 16a in the sixth embodiment.
FIG. 30 is a configuration diagram showing a request statement reserved in a request data area 20a in the sixth embodiment.
Figure 31:
FIG. 31 is a configuration diagram showing a content stored in a device converting table 18r in the sixth embodiment.
Figure 32:
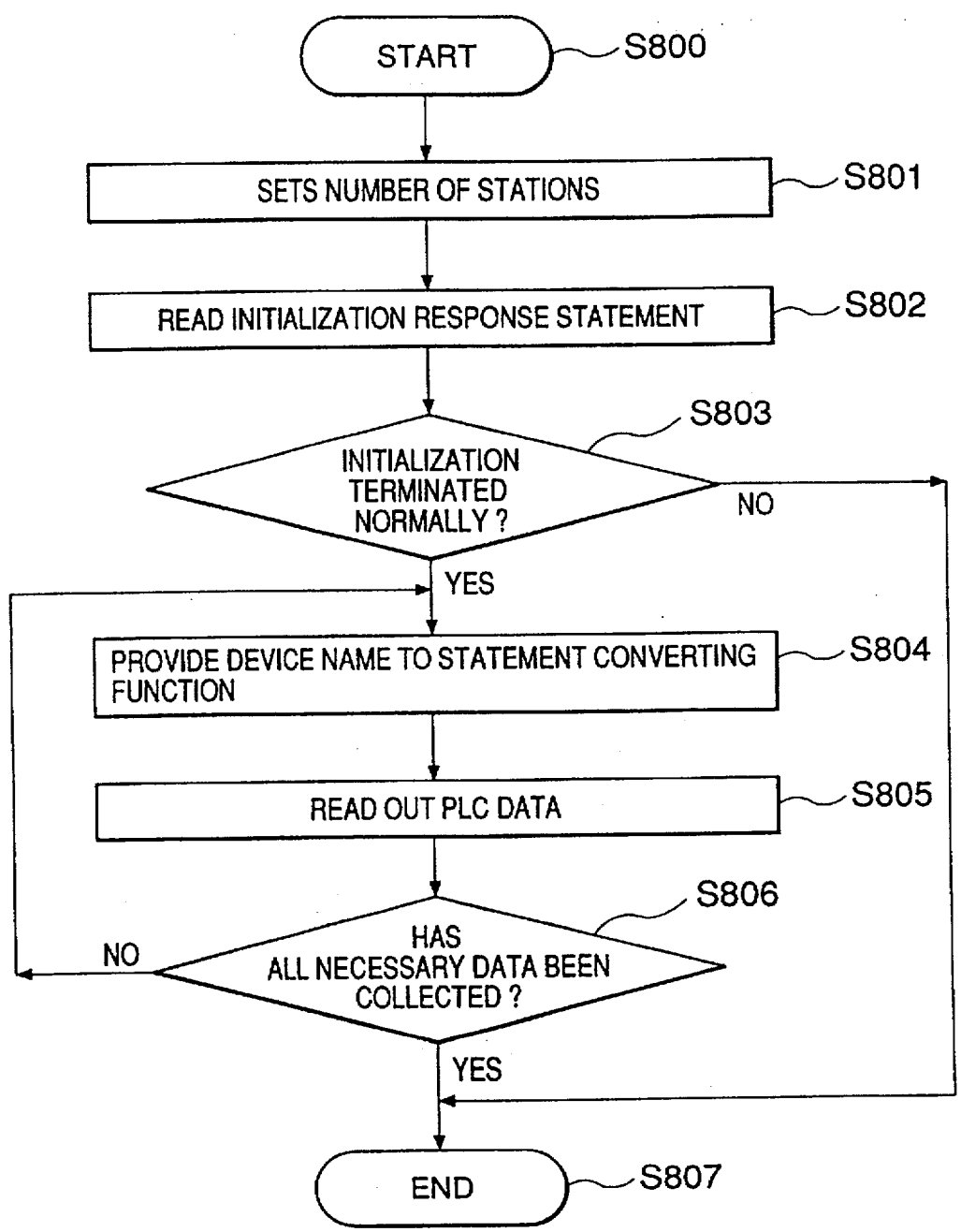
FIG. 32 is a flowchart showing the operation of the user program 13a in the sixth embodiment.
Figure 33:
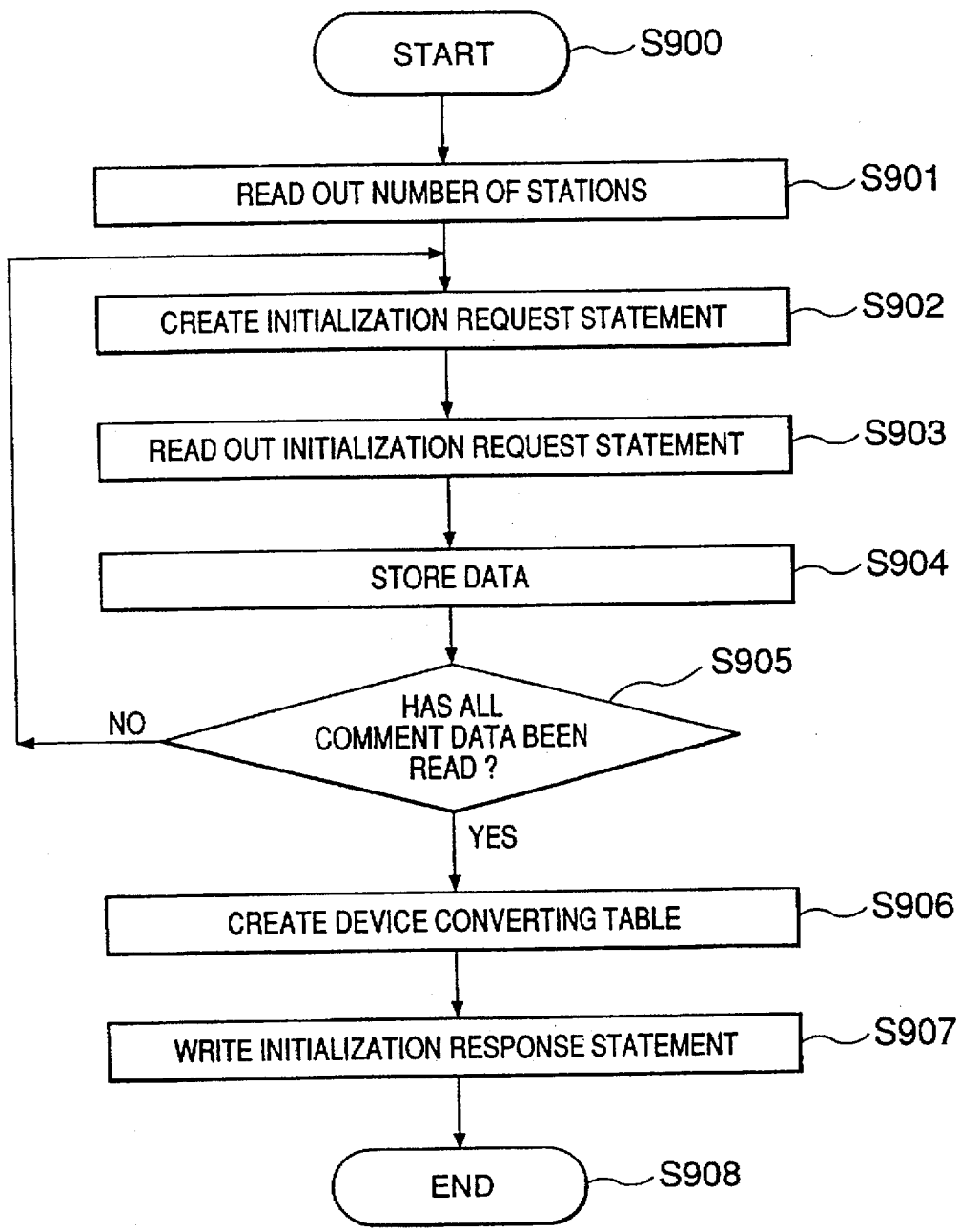
FIG. 33 is a flowchart showing the operation of an initializing function 18q in the sixth embodiment.
Figure 34:
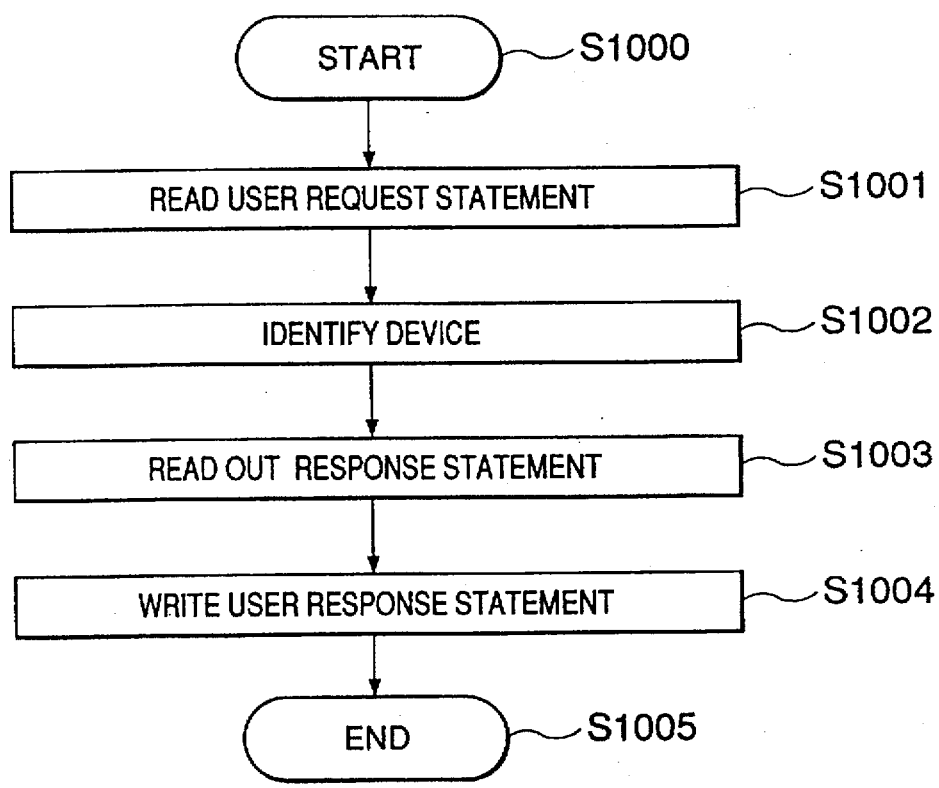
FIG. 34 is a flowchart showing the operation of a statement converting function 18s in the sixth embodiment.

With reference to FIG. 26 to FIG. 34, a sixth embodiment of the present invention in which a user program can obtain data from a device simply by specifying a device name, will be described. FIG. 26 is a block diagram showing a function which is implemented among the first memory 13 in the first control unit 8, the first two-port memory 16, the second memory 18 in the second control unit 9, the second two-port memory 20, the PLC communication board 11, and the PLCs 3, 4, and 5. FIG. 27 is an example of an initialization request statement reserved in the request data area 16a. FIG. 28 is an example of an initialization response statement reserved in the response data area 16b. FIG. 29 is an example of a user request statement reserved in the request data area 16a. FIG. 30 is an example of a request statement reserved in the request data area 20a. FIG. 31 is an example of a content stored in a device converting table 18r. FIG. 32 is a flowchart showing the operation of the user program 13a. FIG. 33 is a flowchart showing the operation of an initializing function 18q. Finally, FIG. 34 is a flowchart showing the operation of a statement converting function 18s.

As shown in FIG. 26, the second memory 18 includes an initializing function 18q, that is, a device information setting function which reads out an initialization request statement, which has been written by the user program 13a in the request data area 16a, and writes it in the request data area 20a so as to provide it to the send/receive function 27a of the PLC communication board 11. The initializing function 18q also creates a device converting table 18r in accordance with the data read out via the send/receive function 27a from comment file areas 3a, 4a, and 5a, which are provided in the PLCs 3, 4, and 5, respectively. A device converting table 18r stores the station numbers, the types of devices, the device numbers, and device sizes which correspond to the device names of the PLCs 3, 4, and 5.

A statement converting function 18s reads out the user request statement containing the device name written into the request data area 16a by the user program 13a, and determines, from the device converting table 18r, the station number, the type of device, the device number, and the device size which correspond to the device name. The statement converting function 18s then writes the determined information in the request data area 20a to thus provide a request statement, which has the aforesaid information stored, to the send/receive function 27a. Further, the statement converting function 18s also reads out, from the response data area 20b, a response statement which stores the data on the specified device of the specified station number, which has been read out via the send/receive function 27a and written to the response data area 20b. The statement converting function 18s also writes the response statement as a user response statement in the response data area 16a to thereby provide it to the user program 13a.

Comment file areas 3a, 4a, and 5a, which are provided in the PLCs 3, 4, and 5, respectively, and registered by a user beforehand, store the comment files containing the station numbers, the types of devices, the device numbers, and device sizes corresponding to the respective device names of the respective PLCs.

As shown in FIG. 27, the number of stations "n" in an initialization request statement functions to set the last station number of PLC when a comment file is read out from the comment file areas 3a, 4a, and 5a. Based on the number of stations "n", the initializing function 18q reads out comment files from all PLCs comprising from 1 to n in order to create the device converting table 18r.

As shown in FIG. 28, an initialization response statement has an error code which indicates whether initialization has been normally performed. If initialization is terminated in normal operation, then "0" is stored. However, if initialization fails, then a numeral other than "0" is stored.

As shown in FIG. 29, a device name such as "POWER SUPPLY 3" in the user request statement is a comment added to a device by a user when creating the PLC program. The statement converting function 18s finds the data corresponding to the same device name as a specified device name from the device converting table 18r to thus obtain the corresponding data such as a station number, the type of data, data number, and device size.

As shown in FIG. 30, the station number in the request statement is an area where the station number of PLC, from which data is read out, is set. The type of device is an area where the type of device, from which data is read out, is set. The device number is an area where the number of the device of the specified type, from which data is read out, is specified. In the fourth area, the term "REQUEST", which a request statement, is written. In this case, the send/receive function 27a converts the request statement by using a communication function, for example, type 2 function, before Sending it to the PLC I/F 26.

As shown in FIG. 31, the station numbers, the types of devices, and device numbers which correspond to device names'are stored in the device converting table 18r.

As shown in FIG. 32, the user program 13a begins its operation in step S800 and sets, in step S801, the number of stations in an initialization request statement in the request data area 16a to provide it to the initializing function 18q. In step S802, the user program 13a reads out the initialization response statement, in which the error code written by the initializing function 18q in the response data area 16b is stored, and determines in step S803 whether the initialization has been terminated normally.

If the user program 13a determines that the initialization has not been terminated normally, then it skips to step S807 and terminates its operation. If the user program 13a finds that the initialization has been terminated normally, then it writes, in step S804, the device name in the user request statement as the name of the PLC, from which data is to be read out, to the request data area 16a in order to provide it to the statement converting function 18s. In step S805, the user program 13a reads out the user response statement wherein the PLC data written by the statement converting function 18s is stored. In step S806, the user program 13a then determines whether all necessary data has been collected. If all such data has not been collected, then the user program returns to step S804 to repeat steps S804 to S806. If all such data has been collected, then it terminates the operation in step S807.

As shown in FIG. 33, the initializing function 18q starts its operation in step S900, and reads out, in step S901, the number of stations in the initialization request statement written by the user program 13a into the request data area 16a. In step S902, based on the number of stations, which has been read out, the initializing function 18q creates an initialization request statement, in which the station number and data to be read out are stored, in order to read out comment files from the comment file areas 3a, 4a, and 5a of the PLC 3, 4, and 5 from 1 to the number of stations. Then, in step S903, the initializing function 18q reads out the initialization response statement written by the send/receive function 27a in the response data area 20b, and in step S904, stores the data in an area (not shown) reserved in the second memory 18.

In step S905, the initializing function 18q determines whether all comment data in the specified number of stations has been read out. If all such data has not been read out, step S902 to repeat steps S902 to S904. If all such data has been read out, then the processing returns, in step S906, a table is created in the device converting table 18r by sorting out the data reserved in the second memory 18 by the device name, the number of stations, the type of device, and the device number. In step S907, the initializing function 18q writes the initialization response statement, in which an initialization error code is stored, into the response data area 16b to hand it to the user program 13a. Then, the operation is terminated in step S908.

As shown in FIG. 34, the statement converting function 18s starts its operation in step S1000, and in step S1001, reads out the user request statement, in which the device name written by the user program 13a is stored, from the request data area 16a. In step S1002, the statement converting function 18s identifies the same device name as the device name, which has been read out in the previous step, from the device converting table 18r to obtain the station number, the type of device, and the device number corresponding to the device name to create a request statement, and writes the request statement to the request data area 20a to provide it to the send/receive function 27a.

In step S1003, the statement converting function 18s reads out a response statement, in which the data on the PLC 3, 4, and 5, written by the send/receive function 27a into the response data area 20b, is stored, and in step S1004, writes a user response statement, in which the data on the PLC 3, 4, and 5 is stored, to the response data area 16b to hand it to the user program 13a.

Hence, as demonstrated, the initializing function 18s creates a table of the device names, the station numbers, the types of devices, and the device numbers, which correspond to the number of stations beforehand, in the device converting table 18r, and then the user only has to specify a device comment, for example, a device name such as "POWER SUPPLY 3" added at the time of creating the ladder circuit, to have the statement converting function 18s collect the data on the PLCs 3, 4, and 5 via the send/receive function 27a. Thus, an extremely simplified user program with consequent reduced burden on the user, is achieved.

Figure 35:
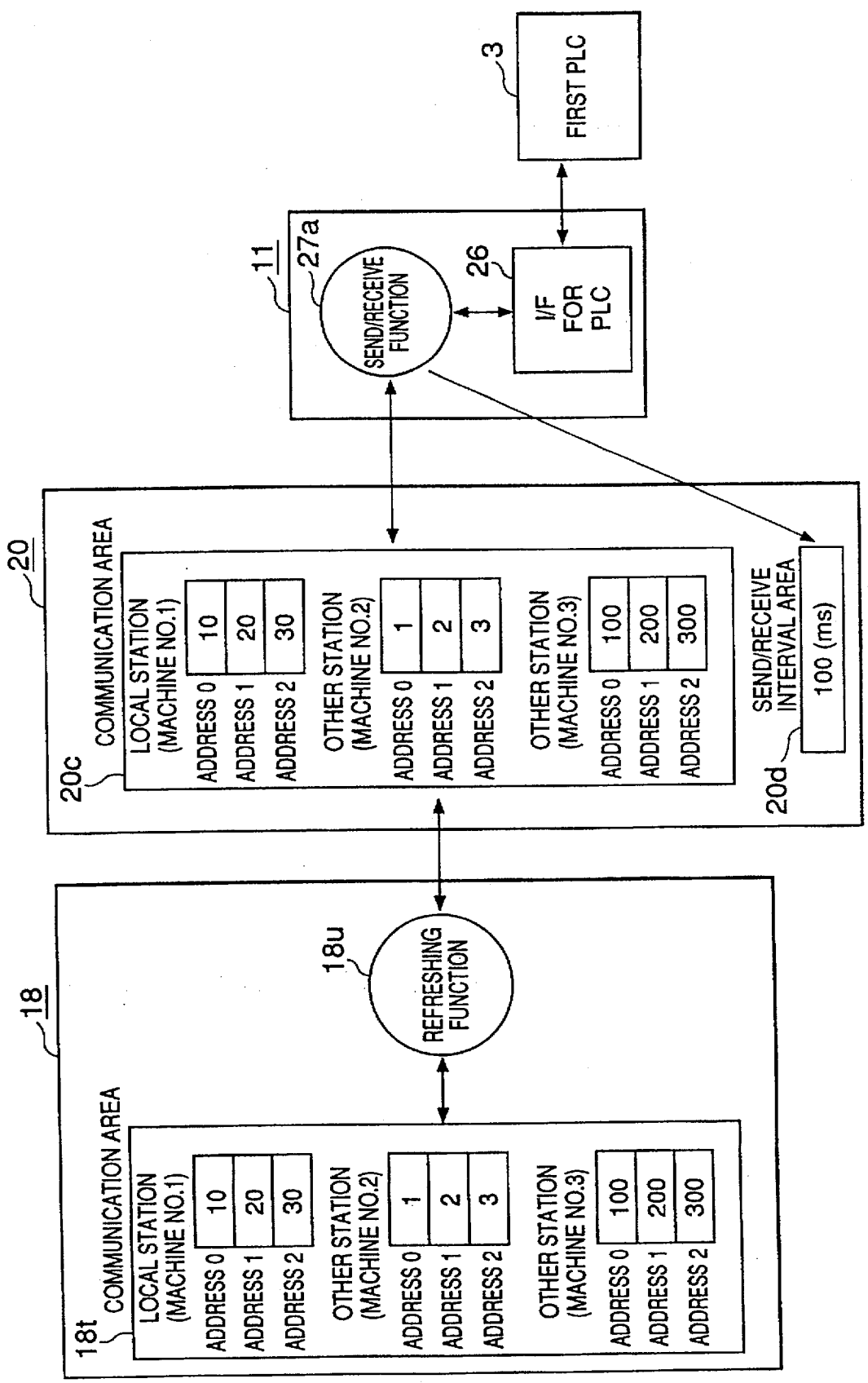
FIG. 35 is a block diagram showing a function implemented among the second control unit 9, the second two-port memory 20, the PLC communication board 11, and the PLC 3 according to a seventh embodiment of the present invention.
Figure 36:
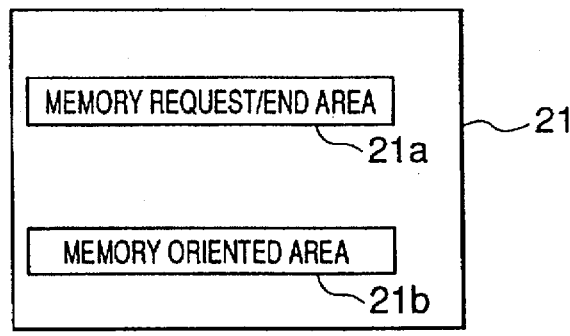
FIG. 36 is a configuration diagram showing an I/O 21 in the seventh embodiment.
Figure 37:
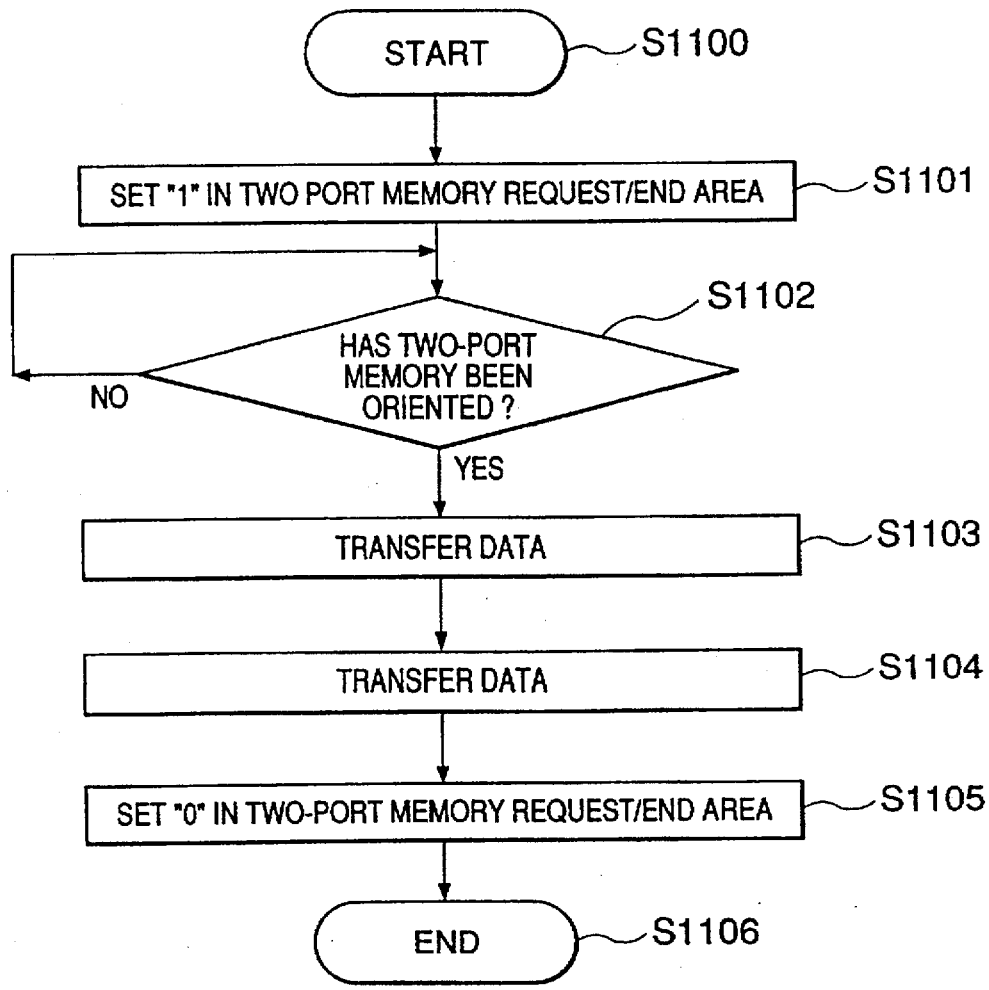
FIG. 37 is a flowchart showing the operation of a refreshing function 18u in the seventh embodiment.
Figure 38:
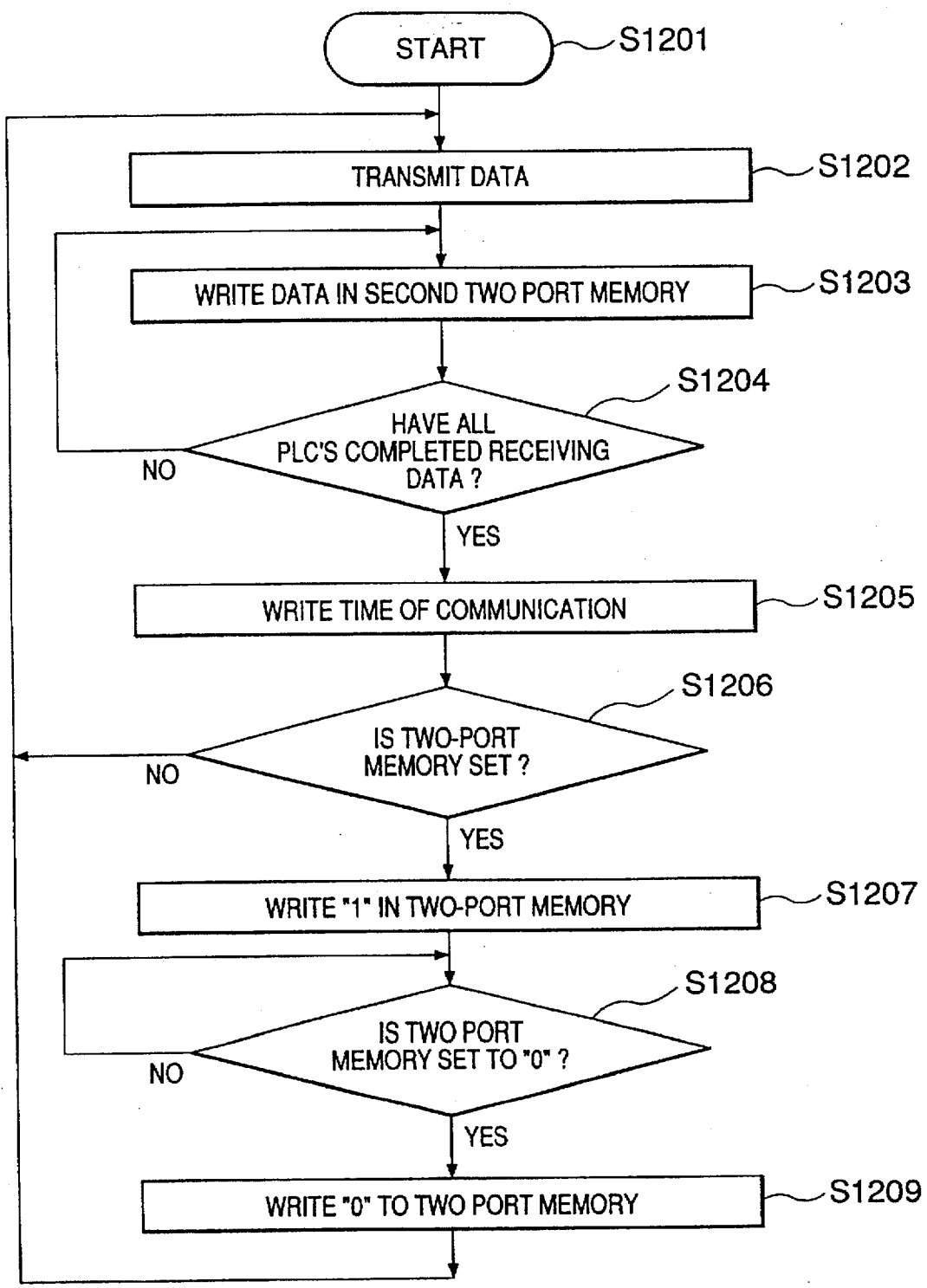
FIG. 38 is a flowchart showing the operation of a send/receive function 27a in the seventh embodiment.
Figure 39:
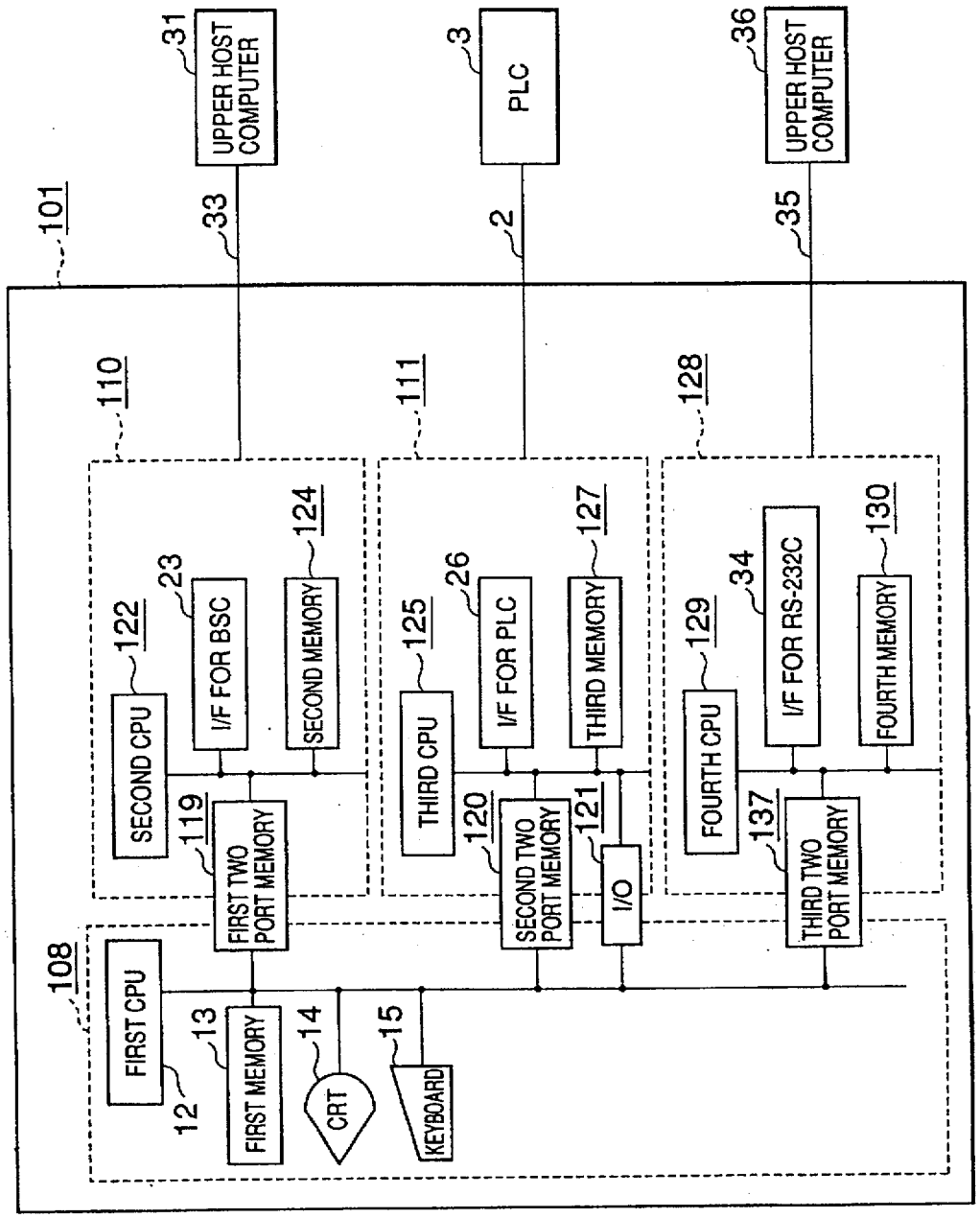
FIG. 39 is a block diagram illustrating the configuration of a conventional FA controller.
Figure 40:
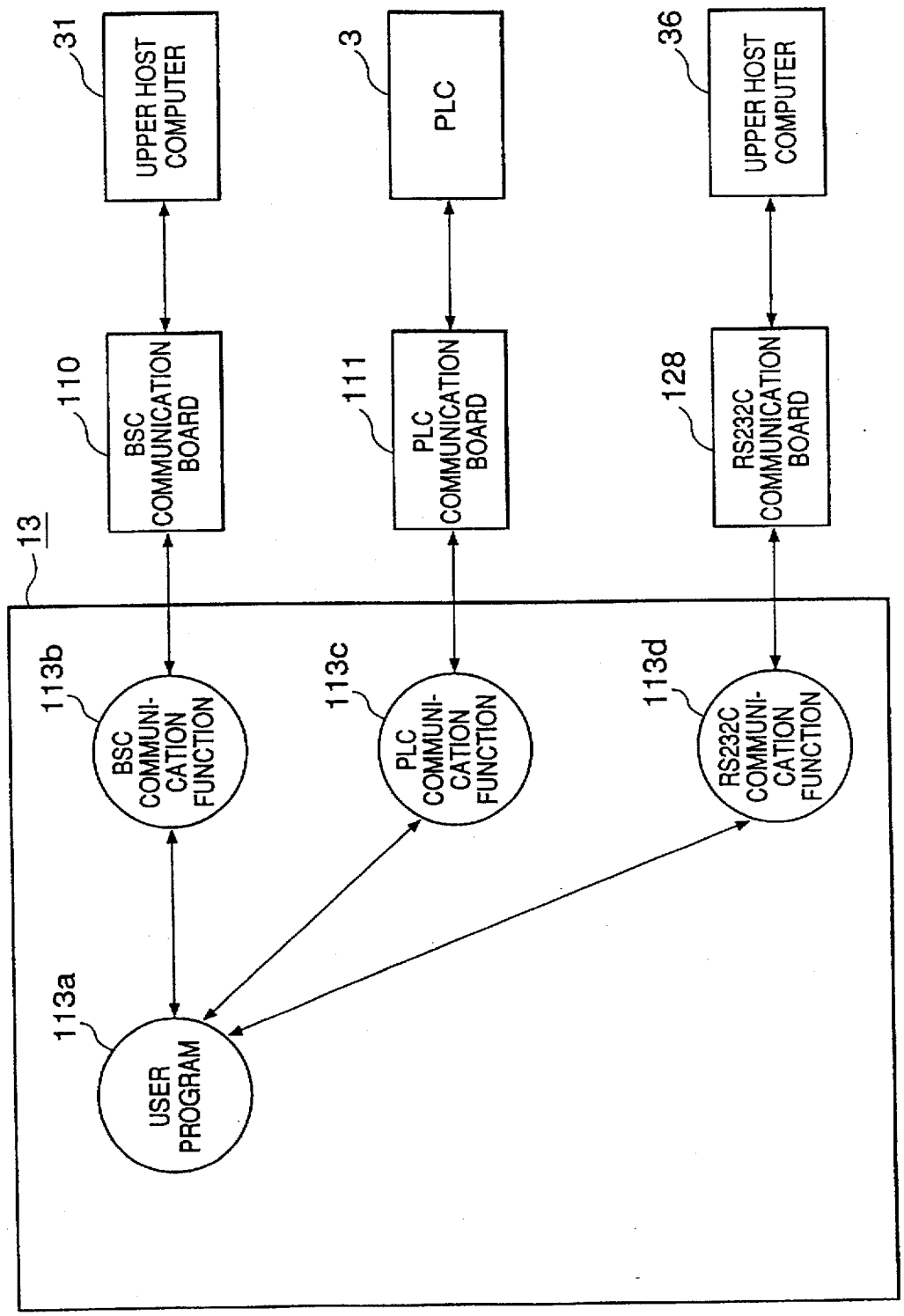
FIG. 40 is a block diagram illustrating the functions of the conventional FA controller.
Figure 41:
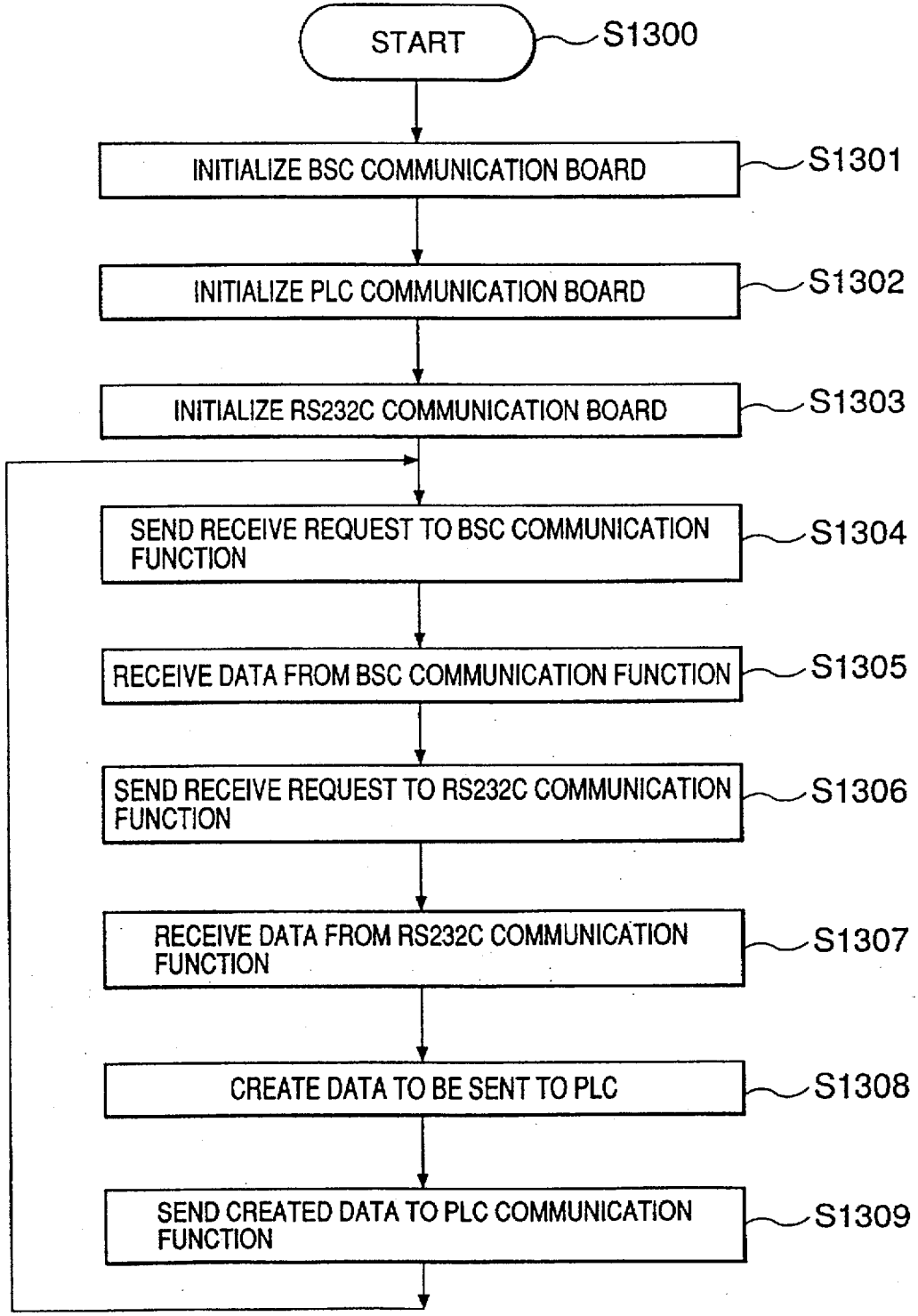
FIG. 41 is a flowchart illustrating the operation of a user program of the conventional FA controller.

Referring to FIGS. 1 and 2, and FIGS. 35 to 38, a seventh embodiment of the present invention, in which a refreshing function is used to enable fast exchange of information through a memory and a two-port memory, will be described. FIG. 35 is a block diagram showing a function which is implemented among the second memory 18 in the second control unit 9, the second two-port memory 20, the PLC communication board 11, and the PLC 3. FIG. 36 shows an example of the content of the I/O 21 shown in FIG. 2. FIG. 37 is a flowchart showing an example of the operation of a refreshing function 18u. FIG. 38 is a flowchart showing an example of the operation of the send/receive function 27a.

As shown in FIG. 35, the second memory 18 includes a communication area 18t which comprises a local station area (machine No.1), where the data on a user program provided in the first memory 13 of FIG. 2 is written by a writing function (not shown), and other station areas (machine No. 2, machine No. 3) from which the data on the PLC 3 is read out by a reading function (not shown) to provide it to the user program. A refreshing function 18n transfers the data in the local station area of the communication area 18t to the local station area of a communication area 20c in the second two-port memory 20, which will be described later, and transfers the data in other station area of the communication area 20c to the other station area of the communication area 18t in the second memory 18.

The communication area 20c in the second two-port memory 20 also comprises a local station area and other station areas for exchanging data with the PLC 3 through a send/receive function 27a, and exchanges data with the communication area 18t in the second memory 18 through the refreshing function 18U. The send/receive function 27a in the PLC communication board 11 transmits the data of a local station area of the communication area 20c in the second two-port memory 20 to the PLC 3 via the PLC I/F 26, receives the data from the PLC 3 via the PLC I/F 26, and writes it to the other station area of the communication area 20c in the second two-port memory 20. The send/receive function 27a also writes the time for a communication with the PLC 3 to a send/receive interval area 20d in the second two-port memory 20.

Further, the data on the PLC 3, which performs communication via the control LAN 2 shown in FIG. 1, is stored in the communication area 20c provided in the second two-port memory 20. FIG. 35 illustrates the data written by the refreshing function 18u into a local station area, such as machine No. 1 of the communication area 20c, and the data received from other station area, such as machine No. 2 and machine No. 3.

As shown in FIG. 36, the I/O 21 illustrates the exchange of information when the refreshing function 18u and the send/receive function 27a share the communication area 20cof the second two-port memory 20. A two-port memory request/end area 2/a is set by the refreshing function 18u. A two-port memory oriented area 2/b is set by the send/receive function 27a. When the two-port memory request/end area 21a is "1", a two-port memory request is indicated. The send/receive function 27a thus sets "1" in the two-port memory oriented area 21b and directs the second two-port memory 20 to the refreshing function 18u. When the two-port memory request/end area 21a is "0", a two-port memory end is indicated. The send/receive function 27a thus sets "0" in the two-port memory oriented area 21b to orient the second two-port memory 20 to the send/receive function 27a.

As shown in FIG. 37, the refreshing function 18u begins its operation in step S1100, and performs the operation at the time intervals shown in the send/receive interval area 20d. In step S1101, "1" is set in the two-port memory request/end area 21a to orient the second two-port memory 20 to the refreshing function 18u. Then, in step S1102, it is determined whether the second two-port memory 20 has been oriented to the refreshing function 18u. If the second two-port memory 20 has not been oriented to the refreshing function 18u, then the checking is repeated until the second two-port memory 20 is oriented to the refreshing function 18u.

When the second two-port memory 20 is directed to the refreshing function 18u, the data in the local station area of the communication area 18t in the second memory 18 is transferred to the local station area of the communication area 20c in the second two-port memory 20 in step S1103. In step S1104, the data in the other station area of the communication area 20cin the second two-port memory 20 is transferred to the other station area of the communication area 18t in the second memory 18. Then, in step S1105, "0" is set in the two-port memory request/end area 21a so as to notify the send/receive function 27a of the end of the use of the second two-port memory 20, and the operation is terminated in step S1106.

As shown in FIG. 38, the send/receive function 27a starts its operation in step S1201, and in step S1203, transmits the data in the local station area of the communication area 20c in the second two port memory 20 to the PLC 3 via the control LAN 2. In step S1203, the data from the PLC 3 is written to the other Station area of the communication area 20c in the second two-port memory 20. Then, in step S1204, the send/receive function 27a checks whether all PLCs have completed the receiving. If all PLCs have not completed the receiving processing to step S1203 to continue writing the data.

If the receiving has been completed, on the other hand, then in step S1205, the send/receive function 27a writes, the time of communication with all PLC stations into the send/receive interval area 20d in the second two-port memory 20. Then, in step S1206, the send/receive function 27a determines whether the two-port memory request/end area 21a has been set for "1". If it has not been set for "1", processing returns to step S1202 to repeat steps S1202 to S1205. If the two-port memory request/end area 21a has been set for "1", then "1" is written into the two-port memory oriented area 21b, and the two-port memory 20 is directed to the refreshing function 18u.

In step S1208, the send/receive function 27a determining whether the two-part memory request/end area 21a has been set for "0" and if not, it maintains the current state. If the two-port memory request/end area 21a is set for "0," then in step S1209, the send/receive function 21a writes "0" to the two-port memory oriented area 21b, directs the two-port memory 20 to the send/receive function 27a, and returns to step S1202 to repeat the aforesaid operation.

Hence, as demonstrated the refreshing function 18u exchanges the content of the communication area 18t in the second memory 18 with the content of the communication area 20c in the second two-port memory 20 at the send/receive intervals, thereby providing fast writing and reading of data to and from the PLC 3.

The aforementioned fourth to seventh embodiments show the examples wherein the second control unit 9 exchanges information with a lower controller PLC. However, the same procedure applies to a case wherein the second control unit 9 exchanges information with an upper controller.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A data processing apparatus for a factory automated (FA) controller, comprising:

a first control unit which commands the collection of data from a plurality of upper or lower controllers;

a second control unit which exchanges data with said plurality of upper or lower controllers in response to the command issued by said first control unit, said second control unit including a memory which stores, in advance of issuance of said command by said first control unit, at least a portion of data or a data processing instruction identifying a manner in which said data collected from said plurality of upper or lower controllers is to be processed; and a two-port memory which enables transfer of information, including said command, between said first control unit and said second control unit.

2. A data processing apparatus for an FA controller as claimed in claim 1, further comprising another two-port memory which enables transfer of second information between the second control unit and the plurality of upper or lower controllers.

3. A data processing apparatus for an FA controller as claimed in claim 1, wherein:

the first control unit includes a designator which designates a plurality of channel numbers indicating from which of said plurality of upper or lower controllers data is to be collected, and request data which comprises initialization data and send/receive data; and the memory of the second control unit includes a channel setting table for storing said initialization data and said send/receive data in association with the channel numbers.

4. A data processing apparatus for an FA controller as claimed in claim 1, wherein:

the first control unit includes a communication request issuer which issues, at one time, a plurality of communication requests which comprise communication instructions and data; and the memory of said second control unit includes an area which stores said communication instructions and data provided from said first control unit to said second control unit via said two-port memory.

5. A data processing apparatus for an FA controller as claimed in claim 1, wherein the memory of the second control unit includes a section which stores, as a single group of data, the data processing instructions, data representing those of said plurality of upper or lower controllers which originate a request for data processing, and data representing those of said plurality of upper or lower controllers which are request destinations of the data processing.

6. A data processing apparatus for an FA controller as claimed in claim 1, wherein:

the memory of the second control unit includes a group file setting portion which stores data collecting conditions relating to the collection of data from said plurality of upper or lower controllers in association with group names which have been set; and the first control unit includes a specifier which specifies at least one of said group names to control collection the of said data in accordance therewith.

7. A data processing apparatus for the FA controller as claimed in claim 1, wherein:

the memory of the second control unit includes a device information setter which stores comments, indicating characteristics of devices controlled by the plurality of upper or lower controllers from which data is to be collected, and identifies the devices in relation to the comments; and the first control unit includes a specifier which specifies comments which are compared to the comments stored in said device information setter to specify from which of said plurality of upper or lower controllers said data is to be collected.

8. A data processing apparatus for an FA controller as claimed in claim 1, wherein:

the memory of the second control unit includes a device information setter which stores comments, indicating characteristics of devices controlled by the plurality of upper or lower controllers from which data is to be collected, and identifies the devices in relation to the comments; and the first control unit includes a specifier which, at a time of initialization of said plurality of upper or lower controllers, specifies a number of portions of data to be collected, and specifies comments which are compared to said comments stored in said device information setter to specify from which of said plurality of upper or lower controllers said data is to be collected.

9. A data processing apparatus for an FA controller as claimed in claim 2, wherein:

said another two-port memory comprises:

a communication area which includes a first area for storing command data relating to an object from which data is to be collected, and a second area for storing response data collected from an upper or lower controller; and a sending/receiving interval area which stores communication time intervals indicating a time of communication with said upper or lower controller; and the second control unit comprises:

a communication area, which includes a first area for storing command data to the object from which data is to be collected and a second area for storing response data collected from the upper or lower controller; and a refreshing function element which transfers data between said first areas and between said second areas, and between the communication area of said second control unit and the communication area of said another two-port memory, at the communication time intervals indicated in the sending/receiving interval area.

10. A data processing method for an FA controller comprising a first control unit which commands the collection of data from a plurality of upper or lower controllers, a second control unit which exchanges data with said plurality of upper or lower controllers in response to the command issued by said first control unit, one two-port memory for transferring information between said first control unit and said second control unit, and another two-port memory for transferring information between the second control unit and the plurality of upper or lower controllers, said method comprising a step of:

storing in said second control unit, in advance of issuance of said commands from said first control unit, at least a portion of data or a data processing instruction identifying a manner in which said data collected from said plurality of upper or lower controllers is to be processed.

11. A data processing method for an FA controller as claimed in claim 10, further including the steps of:

(a) using the first control unit to designate a plurality of channel numbers, on which data is to be collected, and request data which consists of initialization data and send/receive data, as being associated with respective ones of said plurality of upper and lower controllers;

(b) storing in the second control unit, prior to issuance of said commands from said first control unit, said initialization data, send/receive data and said channel numbers associated with respective ones of said plurality of upper and lower controllers;

(c) initializing one of said plurality of upper or lower controllers associated with a selected channel number when said selected channel number and an initialization command are provided by said first control unit via said one two-port memory;

(d) exchanging data with one of said plurality of upper or lower controllers whose channel number corresponds to said selected channel number when said selected channel number and a data send/receive command are provided from said first control unit via said one two-port memory; and (e) transmitting response data from the upper or lower controller from which data is to be collected, as identified by said selected channel number, to said first control unit via said one two-port memory.

12. A data processing method for an FA controller as claimed in claim 10, further including the steps of:

(a) issuing a plurality of data processing instructions from the first control unit at one time;

(b) storing said plurality of data processing instructions issued from the first control unit via said one two-port memory in the second control unit;

(c) exchanging data with a specified upper or lower controller according to the data processing instructions retrieved in order from said second control unit; and (d) transmitting the response data from said specified upper or lower controller to said first control unit via said one two-port memory.

13. A data processing method for an FA controller as claimed in claim 10, further including the steps of:

(a) controlling the first control unit to issue data or data processing instructions;

(b) storing, in the second control unit as a group, data processing instructions including transmitted or received data, and which identify an upper or lower controller which is a request originator of data processing, and an upper or lower controller which is a request destination of data processing;

(c) exchanging data with the upper or lower controller, which is the request originator of data processing, and the upper or lower controller, which is the request destination of data processing, according to said stored data processing instructions, when a command of the data processing instruction is provided via said one two-port memory from said first control unit;

(d) exchanging data with the upper or lower controller, which is the request originator of data processing, and the upper or lower controller, which is the request destination of data processing, the request originator and the request destination being those which have been specified when a previous data processing instruction was received, said exchanging being carried out via said other two-port memory when data itself is received from said first control unit via said other two-port memory; and (e) transmitting the response data from the upper or lower controller specified by said data processing instruction to said first control unit via said one two-port memory.

14. A data processing method for an FA controller as claimed in claim 10, further including the steps of:

(a) issuing, from the first control unit, the name of a group from which data is to be collected;

(b) storing data collecting conditions of said plurality of upper or lower controllers, from which data is to be collected, for respective groups names, which have been set externally, in a memory in the second control unit corresponding to the group names;

(c) receiving said group names from said first control unit via said one two-port memory;

(d) transmitting a command for the data collecting conditions for the plurality of upper or lower controllers, which have been stored as corresponding to said group names and from which data is to be collected, to said corresponding upper or lower controllers;

(e) receiving response data from said corresponding upper or lower controllers via said other two-port memory; and (f) transmitting to said first control unit via said one two-port memory said response data which was received from said corresponding upper or lower controllers.

15. A data processing method for an FA controller as claimed in claim 10, further including the steps of:

(a) issuing, from the first control unit, comments which indicate the characteristics of devices described in a program for controlling the plurality of upper or lower controllers;

(b) storing said comments and data representing said devices associated with said comments, in the memory in said second control unit;

(c) receiving said comments from said first control unit via said one two-port memory;

(d) creating a command for collecting data from said devices which have been stored in association with said comments;

(e) transmitting said command to said plurality of upper or lower controllers, from which data is to be collected, via said other two-port memory;

(f) receiving response data from said plurality of upper or lower controllers, from which data is to be collected, via said other two-port memory; and (g) transmitting said received response data to said first control unit via said one two-port memory.

16. A data processing method for an FA controller as claimed in claim 10, further including the steps of:

(a) issuing, from said first control unit, data representing a number of objects from which data is to be collected at the time of initialization and comments which indicate the characteristics of devices described in a program controlling the plurality of upper or lower controllers at the time of data collection;

(b) storing said comments and data representing said devices which correspond to said comments in a memory in said second control unit;

(c) memorizing the devices from which data is to be collected in association with the comments which indicate the characteristics of the devices, when data representing a number of devices is received from said first control unit via said one two-port memory;

(d) creating a command for collecting data from the device which corresponds to the comment which coincides with said stored comment, and transmitting the command to said plurality of upper or lower controllers, from which data is to be collected, via said other two-port memory, when a comment is received from said first control unit via said one two-port memory;

(e) receiving response data from said plurality of upper or lower controllers, from which data is to be collected, via said other two-port memory; and (f) transmitting said response data received to said first control unit via said one two-port memory.

17. A data processing method for an FA controller as claimed in claim 10, further comprising the step of updating first and second data at time intervals of the communication between said plurality of upper or lower controllers, from which data is to be collected, and said second control unit;

said first data comprising a command which has been stored in the other two-port memory and which is issued to the plurality of upper or lower controllers, from which data is to be collected, and response data from the plurality of upper or lower controllers, from which data is to be collected; and said second data comprises a command which has been stored in the second control unit and which is issued to the plurality of upper or lower controllers, from which data is to be collected, and response data from the plurality of upper or lower controllers, from which data is to be collected.

* * * * *